United States Patent
Sahlin et al.

(10) Patent No.: US 9,241,333 B2
(45) Date of Patent: Jan. 19, 2016

(54) MODULAR BASE STATION

(75) Inventors: Henrik Sahlin, Mölnlycke (SE); Bo Göransson, Sollentuna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 280 days.

(21) Appl. No.: 13/976,559

(22) PCT Filed: Jan. 13, 2011

(86) PCT No.: PCT/SE2011/050029
§ 371 (c)(1),
(2), (4) Date: Jun. 27, 2013

(87) PCT Pub. No.: WO2012/096599
PCT Pub. Date: Jul. 19, 2012

(65) Prior Publication Data
US 2013/0287001 A1    Oct. 31, 2013

(51) Int. Cl.
*H04W 72/04*    (2009.01)
*H04L 5/00*    (2006.01)
*H04B 7/02*    (2006.01)
*H04B 7/08*    (2006.01)
*H04W 88/08*    (2009.01)
*H04W 92/20*    (2009.01)

(52) U.S. Cl.
CPC ......... *H04W 72/0486* (2013.01); *H04L 5/0035* (2013.01); *H04W 72/0426* (2013.01); *H04B 7/024* (2013.01); *H04B 7/0842* (2013.01); *H04W 88/08* (2013.01); *H04W 92/20* (2013.01)

(58) Field of Classification Search
CPC ................... H04W 72/0426; H04W 72/0486; H04W 88/08; H04W 92/20; H04L 5/0035; H04B 7/024; H04B 7/0842
See application file for complete search history.

(56) References Cited

U.S. PATENT DOCUMENTS

| | | | |
|---|---|---|---|
| 2008/0233967 A1* | 9/2008 | Montojo et al. | 455/452.2 |
| 2009/0279480 A1 | 11/2009 | Rosenqvist et al. | |
| 2011/0237272 A1* | 9/2011 | Gorokhov et al. | 455/452.1 |
| 2012/0113883 A1* | 5/2012 | Osterling | 370/312 |

(Continued)

OTHER PUBLICATIONS

Ericsson AB et al., Interface Specification—"Common Public Radio Interface (CPRI); Interface Specification", CPRI Specification V4.2 (Sep. 29, 2010), pp. 1-113.*

(Continued)

*Primary Examiner* — Paul H Masur
(74) *Attorney, Agent, or Firm* — Patent Portfolio Builders, PLLC

(57) ABSTRACT

A base station module configured to be part of a group of base station modules comprising the base station module and other base station modules, the group of base station modules together forming a base station, and having antennas for receiving radio signals from mobile stations in a base station communication band, a communication interface for transferring data obtained via the received radio signals to the other base station modules and for receiving corresponding data from the other base station module, a data handling unit selects data for transfer to the other base station modules and an uplink data processing unit processes channels used by a subset of the mobile stations communicating with the base station, where the subset is assigned to the base station module. The base station module uses the data received from the other base station modules to influence processing in the uplink data processing unit.

15 Claims, 22 Drawing Sheets

(56) References Cited

U.S. PATENT DOCUMENTS

2012/0114050 A1* 5/2012 Osterling .................. 375/259
2012/0147810 A1* 6/2012 Wang et al. ................ 370/315

OTHER PUBLICATIONS

Extended European Search Report for European Application No. 11855685.1 mailed Sep. 25, 2014, 8 pages.

Astely et al.: "TD-LTE—The radio-access solution for IMT-Advanced/TDD", Communications and Networking in China (CHINACOM), 2010 $5^{th}$ International ICST Conference on, IEEE, Piscataway, NJ, USA, Aug. 25, 2010, 5 pages.

Marsch et al.: "Field Trial Results on Different Uplink Coordinated Multi-Point (CoMP) Concepts in CellularSystems", GLOBECOM 2010, 2010 IEEE Global Telecommunications Conference, Piscataway. NJ, USA, Dec. 6, 2010, 6 pages.

Kela et al.: "Dynamic packet scheduling performance in UTRA Long Term Evolution downlink", Wireless Pervasive Computing, 2008 ISWPC 2008. $3^{rd}$ International Symposium on, IEEE, Piscataway, NJ, USA, May 7, 2008, pp. 308-313.

International Search Report, PCT/SE2011/050029, Nov. 3, 2011.

Written Opinion of the International Searching Authority, PCT/SE2011/050029, Nov. 3, 2011.

International Preliminary Report on Patentability, PCT/SE2011/050029, May 22, 2013.

I. Akyildiz et al.; "The evolution to 4G cellular systems: LTE-Advanced"; Broadband Wireless Networking Laboratory, School of Electrical and Computer Engineering, Georgia Institute of Technology, Atlanta, GA 30332, U.S.; 217 pages. URL:doi:10.1016/j.phycom.2010.08.001.

S. Brueck, et al.; "Centralized Scheduling for joint transmission coordinated multi-point in LTE-Advanced"; Smart Antennas (WSA), 2010 International ITG Workshop on; Qualcomm CDMA Technol., Nuremberg, Germany; Feb. 23-24, 2010. 8 pages. URL: http://ieeexplore.ieee.org/xpls/abs_all.jsp?arnumber=5456455&tag=1.

P. Marsch, et al.: "Uplink CoMP under Constrained Backhaul and Imperfect Channel Knowledge". Submitted to IEEE Transactions on Wireless Communications in Feb. 2010. 28 pages. URL: http://arxiv.org/PS_cache/arxiv/pdf/1002/1002.3356v1.pdf.

E. Aktas et al.; "Distributed Base Station Processing in the Uplink of Cellular Networks"; Communications, 2006. ICC '06. IEEE International Conference on; Jun. 2006; Department of Electrical and Electronic Engineering, Hacettepe University, Beytepe Ankara 06800, Turkey. 26 pages. URL: http://ieeexplore.ieee.org/xpls/abs_all.jsp?arnumber=4024387&tag=1.

3GPP TS 36.211 V10.7.0 (Feb. 2013); "Evolved Universal Terrestrial Radio Access (E-UTRA)"; Physical Channels and Modulation (Release 10); Technical Specification Group Radio Access Network; Technical Specification, 101 pages.

3GPP TS 36.212 V10.8.0 (Jun. 2013); "Evolved Universal Terrestrial Radio Access (E-UTRA)"; Multiplexing and channel coding (Release 10); Technical Specification Group Radio Access Network; Technical Specification, 79 pages.

Ericsson AB et al., Interface Specification—"Common Public Radio Interface (CPRI); Interface Specification", CPRI Specification V5.0 (Sep. 21, 2011), 119 pp.

* cited by examiner

MODULAR BASE STATION

CROSS REFERENCE TO RELATED APPLICATION

This application is a 35 U.S.C. §371 national stage application of PCT International Application No. PCT/SE2011/050029, filed on 13 Jan. 2011, the disclosure and content of which is incorporated by reference herein in its entirety. The above-referenced PCT International Application was published in the English language as International Publication No. WO 2012/096599 A1 on 19 Jul. 2012.

TECHNICAL FIELD

The invention generally relates to providing a modular base station. More particularly, the invention relates to a base station module configured to be part of a group of base station modules comprising the base station module and other base station modules, the group of base station modules together forming a base station and a method for handling communication in a base station module configured to be part of a group of base station modules comprising the base station module and other base station modules, the group of base station modules together forming a base station.

BACKGROUND

In mobile communication systems, the device responsible for communication with mobile stations is the base station. A base station typically forms one or more cells in which mobile stations may be located.

In modern day mobile systems, there exist a variety of different services that require various amounts of bandwidth. This means that one mobile station may require various amounts of network resources depending on the services it uses. The number of mobile stations that communicate with a base station can also vary considerably. All in all this means that a base station may have to handle considerable differences in load. Furthermore, a base station is traditionally considered as a single entity. This means that the whole base station will always be active independently of the load. This may therefore make the base station consume more energy than necessary, which increases the cost of operation. This may also be disadvantageous from an environmental point of view.

There is therefore a need for a more flexible base station solution that can be more easily adapted to the communication required both in terms of number of mobile stations as well as in terms of bandwidth requirements of the mobile stations.

The present invention is therefore directed towards providing a more flexible base station structure.

SUMMARY

The invention is thus directed towards providing a modular base station.

One object is thus to provide a base station module that can be used for providing a more flexible base station.

This object is according to a first aspect achieved through a base station module configured to be part of a group of base station modules comprising the base station module and other base station modules, the group of base station modules together forming a base station. The base station module comprises:

at least one antenna for receiving radio signals from mobile stations in a base station communication band,
a first communication interface for transferring data obtained via the received radio signals to the other base station modules and for receiving corresponding data obtained via radio signals received by the other base station modules,
a data handling unit that selects data for transfer to the other base station modules, and
an uplink data processing unit that processes channels used by a subset of mobile stations of a set of mobile stations communicating with the base station. The subset is assigned to the base station module and the base station module is configured to use the data that is received from the other base station modules to influence processing in the uplink data processing unit.

Another object is to provide a method for handling communication in a base station module that is configured to be part of a group of base station modules comprising the base station module and other base station modules, the group of base station modules together forming a base station, where the method can be used for making the thus formed base station more flexible.

This object is according to the first aspect achieved through a method for handling communication in a base station module configured to be part of a group of base station modules comprising the base station module and other base station modules, the group of base station modules together forming a base station. The method being performed in the base station module and comprising:

receiving radio signals from mobile stations in a base station communication band,
transferring data obtained via the received radio signals to the other base station modules,
receiving corresponding data obtained via radio signals received by the other base station modules,
processing data in channels used by a subset of mobile stations communicating with the base station, where the subset is assigned to the base station module, and
using the data received from the other base station modules to influence the processing.

The invention according to the first aspect has a number of advantages. It provides distributed processing of communication with mobile stations. This allows the provision of a more flexible base station, which may be expanded or made smaller based on current and future need. It also allows temporary disabling of some or a whole base station module, which may be of advantage when meeting various load requirements or continued use of the base station when some of it is faulty. All this is combined with a good reliability since the radio signals received by all base station modules are used to influence the processing performed in a base station module. The use of the data received from other base station modules thus improves the processing.

According to another aspect of the invention the data handling unit of the base station module comprises a demultiplexing element that separates the received radio signals into a first radio signal group of radio signals relating to the assigned subset of mobile stations and a second radio signal group of radio signals not relating to the assigned subset of mobile stations, provides the radio signals in the second radio signal group to the first communication interface for transfer to the other base station modules and provides the radio signals of the first radio signal group to the uplink data processing unit. The uplink data processing unit then receives data relating to the assigned mobile stations from the other base station modules via the first communication interface as well as from the demultiplexing element and processes the radio signals of the assigned subset of mobile stations received by all base station modules.

According to the same aspect, the method further comprises separating the received radio signals into a first radio signal group of radio signals relating to the assigned subset of mobile stations and a second radio signal group of radio signals not relating to the assigned subset of mobile stations. The performed transferring furthermore comprises transferring of radio signals in the second radio signal group to the other base station modules, the receiving of corresponding data comprises receiving radio signals from mobile stations of the assigned subset having been separated by the other base station modules and the processing comprises processing the radio signals in the first radio signal group and from the mobile stations of the assigned subset received by the other base station modules.

According to a further aspect of the invention, the base station module further comprises an extracting unit, which extracts data from the radio signals that are received via the antenna. This data characterises channels and then characterises at least the channels that are used by the mobile stations of the assigned subset. The base station module also comprises a weight determining element that determines weights for the channels used by the mobile stations of the assigned subset based on the data that characterises channels and an antenna combining element that receives the weights from the weight determining element and applies them to the radio signals received via the antenna for supply of weighted radio signals to the uplink data processing unit.

According to the same aspect, the method further comprises extracting data characterising the channels used by the assigned mobile stations from the received radio signals, determining weights for the channels used by the mobile stations in the assigned subset based on said data that characterises channels and weighting the received radio signals with weights comprising said determined weights.

According to yet another aspect of the invention, the weights have been selected for contributing to the antennas forming a beam together with antennas of the other base station modules.

According to a further aspect of the invention, the data handling unit of the base station module comprises a symbol probability value handling element that determines symbol probability values for the channels used by the whole set of mobile stations based on the received radio signals and sends the determined probability values of the channels used by mobile stations in the assigned subset to the uplink data processing unit and the determined probability values of the channels used by mobile stations in subsets assigned to the other base station modules to the first communication interface for transfer to the other base station modules. The uplink data processing unit receives, from the other base station modules via the first communication interface, probability values of the channels used by mobile stations in the assigned subset and processes the weighted radio signals using the determined and received symbol probability values.

According to the same aspect, the method further comprises determining symbol probability values for the channels used by the whole set of mobile stations based on the received radio signals. Here the transferring of data comprises transferring symbol probability values of channels used by mobile stations in subsets assigned to the other base station modules, receiving data from the other base station modules comprises receiving symbol probability values of channels used by the assigned subset of mobile stations and processing comprises processing the weighted radio signals using determined and received symbol probability values.

According to another aspect, the data handling unit of the base station module comprises the antenna combining element, which provides own weighted radio signals to the first communication interface for transfer to the other base stations modules, receives other weighted radio signals from the other base station modules via the first communication interface, combines the own and other weighted radio signals and supplies the combined weighted signals to the uplink data processing unit for being processed.

According to the same aspect, the further transferring of data performed in the method comprises transferring own weighted received radio signals to the other base station modules and receiving data comprises receiving other weighted radio signals received by the other base station modules. The method here also comprises combining the own and other weighted radio signals and the processing is then performed on the combined radio signals.

According to yet another aspect, the weight determining element is further configured to receive data characterising the channels used by the assigned mobile stations being extracted by the other base station modules, to determine weights associated with the channels for the radio signals received by the other base station modules and to transfer these weights to the other base station modules.

According to the same aspect, the method further comprises receiving data characterising the channels used by the assigned mobile stations being extracted by the other base station modules, where the determining of weights comprises determining of weights associated with the channels for the radio signals received by the other base station modules and further comprising transferring these weights to the other base station modules.

According to a further aspect the extracting unit is further configured to extract, from the received radio signals, data characterising the channels used by the mobile stations assigned to the other base station modules and send this data to the other base station modules, while the antenna combining element is configured to receive weights from the other base station modules via the first communication interface, which received weights are weights determined for channels used by subsets of mobile stations assigned to the other base station modules and also apply the received weights on radio signals received via the antennas.

According to the same aspect, the extracting in the method comprises extracting, from the received radio signals, data characterising the channels used by the mobile stations assigned to the other base station modules, sending this data to the other base station modules, receiving weights from the other base station modules, which received weights are weights determined for channels used by subsets of mobile stations assigned to the other base station modules, and applying the own and received weights when weighting the received radio signals.

According to a further aspect, the base station module further comprises a transforming unit that transforms the radio signals from the time domain to the frequency domain and the communication interface is provided for communicating frequency domain signals.

According to the same aspect, the method further comprises transforming the received radio signals from the time domain to the frequency domain. Here the transferring and receiving to and from the other base station modules is performed on data in the frequency domain.

According to another aspect, there is a preamble detecting unit in at least one of the base station modules. This unit detects at least a group of the preambles for all of the base station modules. The base station module here comprises an access channel data extracting unit that extracts data received in an access channel and supplies it to every preamble detecting unit. The base station module may here also include a preamble detecting unit.

According to yet another aspect, the base station module comprises a downlink data processing unit that codes data to be sent in radio signals to the assigned subset of mobile stations in corresponding channels and a second communication interface that receives data from the other base station modules concerning the mobile stations in subsets assigned to the other base station modules and transmits data of the mobile stations in the assigned subset to the other base station modules. The base station module also comprises at least one transmitting antenna via which the data of the whole set of mobile stations is transmitted to the other modules for transmission.

According to the same aspect, the method further comprises coding data to be sent in radio signals to the assigned set of mobile stations in corresponding channels, receiving data from the other radio base station modules concerning the rest of the mobile stations and transmitting data concerning the assigned set of mobile stations to the other base station modules.

According to a further aspect, the data received via the second communication interface are radio signals with data concerning mobile stations outside of the assigned subset and the base station module also comprises a multiplexing unit connected to the downlink data processing unit and to the second communication interface for receiving coded and modulated signals with data concerning all mobile stations and combining them to at least one radio signal for transmission over the at least one transmitting antenna.

According to the same aspect, the data received via the second communication interface are radio signals with data concerning mobile stations outside of the assigned set and the method further comprises combining coded and modulated signals with data concerning all mobile stations to at least one radio signal and transmitting the signal over the at least one transmitting antenna.

According to another aspect, the downlink data processing module is connected to the second interface for sending non-coded and non-modulated data to and receiving non-coded and non-modulated data from the other base station modules and processes non-coded and non-modulated data to form the at least one radio signal.

According to the same aspect, the method further comprises sending non-coded and non-modulated data to and receiving non-coded and non-modulated data from the other base station modules and processing non-coded and non-modulated data to form the at least one radio signal.

According to yet another aspect, there exists a mobile station assigning unit configured to assign mobile stations to the base station modules. Here the method also comprises assigning mobile stations to the base station modules.

According to a further aspect, the base station module further comprises a signal quality determining unit that provides the mobile station assigning unit with signal quality data for assisting in the assigning of mobile stations. In this case the assigning performed in the method is performed based on signal quality data.

According to a further aspect, the base station module also comprises the mobile station assigning unit.

According to yet another aspect, there is a user data collecting unit connected to the data processing units of all the base station modules for providing a single connection point to other devices of a communication network.

According to a further aspect, the mobile station assigning unit is configured to receive health data from the base station modules and perform mobile station assignment based on the received health data. Here the health data may comprise fault location data and the mobile station assigning unit may reconfigure the use of units, elements and/or antennas based on fault location data. The mobile station assigning unit may additionally or instead assign mobile stations based on load, which assigning may comprise temporarily disabling a base station module if the load is low.

According to this aspect, the method further comprises receiving health data from the base station modules and the mobile station assignment is then performed based on the received health data. Here the health data may comprise fault location data in which case the assigning comprises reconfiguring the use of units, elements and/or antennas based on fault location data. The assigning of mobile stations may also be performed based on load, which comprises temporarily disabling a base station module if the load is low.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description with unnecessary detail.

Figure 1:
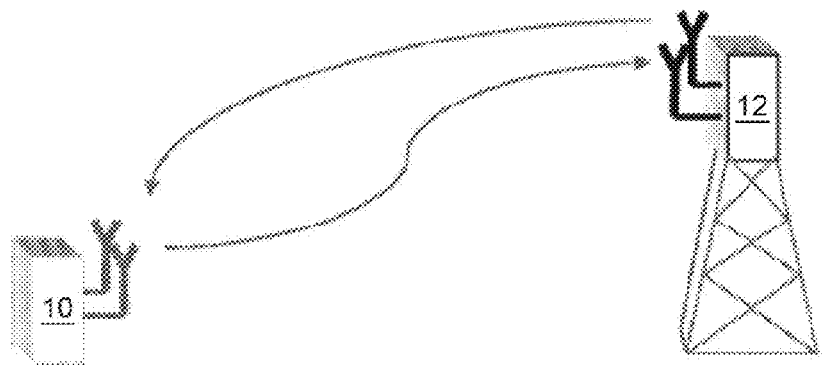
FIG. 1 schematically shows a mobile station communicating with a base station.

FIG. 1 schematically shows a mobile station 10 communicating in uplink as well as in downlink with a base station 12.

In the Long Term Evolution (LTE) of 3GPP, a new flexible air interface is currently being standardized. This interface is described in 3GPP TS 36.211, "Physical Channels and Modulation" Technical Specification, Group Radio Access Network, which document is herein incorporated by reference.

The LTE system will provide spectrum flexibility in the sense that varying carrier bandwidths between 1.25 MHz and 20 MHz may be handled, and both Frequency Division Duplex (FDD) and Time Division Duplex (TDD) will be supported in order to be able to use both paired and unpaired spectrum. LTE is expected to be smooth evolution path for 3G standards such as Wideband Code Division Multiple Access (WCDMA), Time Division—Code Division Multiple Access (TD-CDMA) and Time Division—Synchronous Code Division Multiple Access (TD-SCDMA). LTE is also expected to offer significant performance improvements as compared with current 3G standards by using for example various advanced antenna techniques. In a wireless system for mobile communication, the transmission from a Base Station (BS), often denoted eNodeB, to mobile stations, in LTE often denoted User Equipment (UE), is referred to as the downlink, see FIG. 1. In the same way, the transmission from a mobile station 10 to base station 12 is referred to as uplink.

Figure 2:
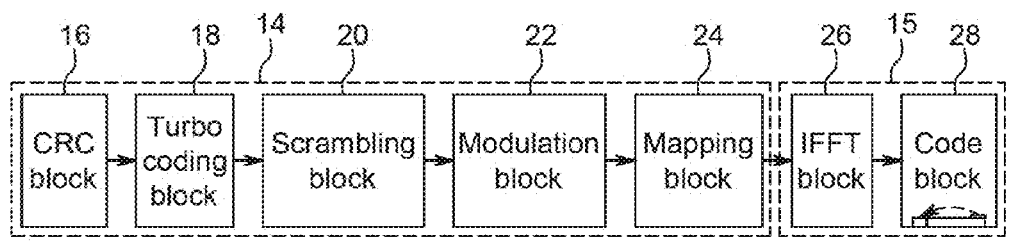
FIG. 2 shows a simplified block schematic of a number of downlink data processing blocks in a base station.

In the downlink, the physical layer is based on Orthogonal Frequency-Division Multiplexing (OFDM). The various blocks of a base station handling communication according to OFDM is shown in FIG. 2. This type of data handling is also described in more detail in the previously mentioned paper 3GPP TS 36.211, "Physical Channels and Modulation" Technical Specification, Group Radio Access Network.

In FIG. 2 there is a downlink data processing unit 14 and a transforming unit 15. Here the uplink data processing unit 14 comprises a CRC (Cyclic Redundancy Check) block 16, a turbo coding block 18, a scrambling block 20 a modulation block 22 and a mapping block 24, while the transforming unit 15 comprises an IFFT (Inverse Fast Fourier Transform) block 26 and a code block 28. Data to be transmitted is first provided with an error correction code by the CRC block 16. That data to be transmitted is then coded by the coding block 18, which may be a turbo coding element, using turbo codes. Such coding is for instance described in 3GPP TS 36.212, "Multiplexing and channel coding" Technical Specification, Group Radio Access Network, which is herein incorporated by reference. The coded data is then interleaved and scrambled by the scrambling block 20 and thereafter modulated to symbols by the modulating block 22. Here it is possible to use a variety of different modulating techniques, such as QPSK (Quadrature Phase Shift Modulation), 16 QAM (Quadrature Amplitude Modulation) and 64 QAM (Quadrature Amplitude Modulation). This type of modulation is described in more detail in 3GPP TS 36.211, "Physical Channels and Modulation" Technical Specification, Group Radio Access Network.

The symbols are then fed to the mapping block 24, which performs mapping to a specified frequency interval, which is referred to as a number of sub-carriers. The signals are then provided to the Inverse Fast Fourier Transformation (IFFT) block 26 of the transforming unit 15 for transforming the signals to the time domain and thus forming an OFDM symbol. This OFDM symbol is provided to a Cyclic Prefix block 28 in which a cyclic prefix is appended before the OFDM symbol by repeating a number of the last time domain samples of the OFDM symbol.

All these blocks are well known. However, according to some variations of the invention the blocks 16-24 are provided in a downlink data processing unit 14, while the blocks 26 and 28 are provided in a transforming unit. These units are furthermore separated from each other.

In the uplink, the physical layer may be based on Single Carrier Frequency Division Multiple Access (SC-FDMA), which is also referred to as pre-coded OFDM. This means that the physical channels are build of SC-FDMA symbols. Here, CRC coding, turbo coding, scrambling and modulation is essentially performed in the same way as in the downlink case. The modulated symbols are transformed to the frequency domain by a DFT (Discrete Fourier Transform) unit and mapped using frequency mapping of the same size as the number of modulated symbols of each SC-FDMA symbol. This is then fed to a larger IFFT with a size which depends on the bandwidth of the radio communication link and thereafter a cyclic prefix is added.

In this way, several mobile stations may be scheduled to transmit simultaneously, both in downlink and uplink, typically on different parts of the frequency band in a TDMA/

FDMA fashion. At the receiver of the base station, one large FFT is taken from the output of each receiver antenna and the mobile stations are separated.

Figure 3:
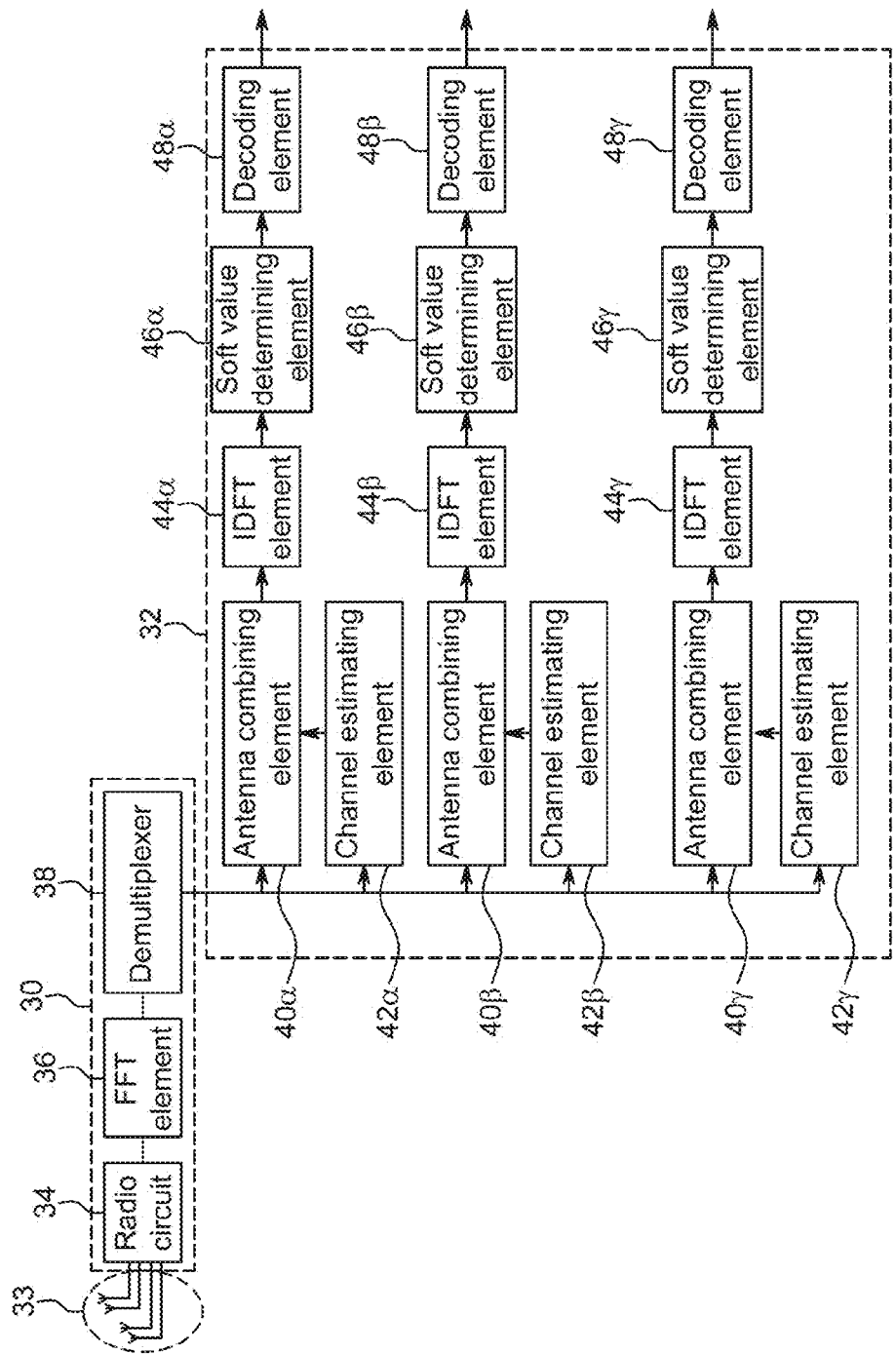
FIG. 3 shows a simplified block schematic of a number of different uplink data processing blocks in a base station.

An illustration of an uplink receiver is given in FIG. 3. Here, a group of receiving antennas 33 are connected to a radio circuit 34. After the radio circuit, an FFT element 36 transfers the samples into the frequency domain such that the frequency intervals corresponding to each mobile station may be extracted (de-multiplexed) by a demultiplexer 38. The radio circuit 34, FFT element 36 and demultiplexer 30 here together form a first transforming unit 30. The demultiplexer 38 is in turn connected to a number of signal handling branches, where there is one branch for each mobile station being handled. There is here a first, second and third exemplifying branch $\alpha$, $\beta$, $\gamma$ where $\alpha$, $\beta$, $\gamma$ are used for indicating a specific mobile station channel being handled. Each branch includes an antenna combining element $40\alpha$, $40\beta$, $40\gamma$ connected to an inverse discrete Fourier Transforming (IDFT) element $44\alpha$, $44\beta$, $44\gamma$, which in turn is connected to a probability value determining element or soft value determining element $46\alpha$, $46\beta$, $46\gamma$. The soft value determining elements $46\alpha$, $46\beta$, $46\gamma$ are each connected to a corresponding decoding element $48\alpha$, $48\beta$, $48\gamma$ decoding the signals. Each branch also includes a channel estimating element $42\alpha$, $42\beta$ and $42\chi$ connected to the demultiplexer 38 as well as to the antenna combining elements $40\alpha$, $40\beta$, $40\gamma$ of the corresponding branch.

The channel estimating elements $42\alpha$, $42\beta$ and $42\chi$ obtain or extract reference signals from the demultiplexer and determine channel estimates that are to be used for obtaining weights intended for the antenna combining elements $40\alpha$, $40\beta$, $40\gamma$. Since LTE uplink is based on SC-FDMA, the signal is then converted to the time domain by the IDFT elements $44\alpha$, $44\beta$, $44\gamma$, followed by soft value calculation by the soft value determining elements $46\alpha$, $46\beta$, $46\gamma$ and decoding and demodulation by the demodulating and decoding elements $48\alpha$, $48\beta$, $48\gamma$.

For LTE all transmissions from the mobile stations should arrive at the base-station within a time window of the same length as the cyclic prefix, CP. This may be ensured by estimating the time-of-arrival of the uplink signals from each mobile, and by sending TA (Time Alignment) commands in the downlink to each mobile, whenever needed.

LTE advanced is a further evolution of LTE. Within this new system, several new concepts are currently evaluated. One of the most promising concepts is CoMP (Coordinated Multi Point), where CoMP is a system with a large amount of network antennas placed at large distances apart and where all are connected to one base station.

In a system which uses Multi-User Multiple Input Multiple Output (MU-MIMO), several mobile stations are scheduled to transmit simultaneously on the same carriers. These mobile stations may be distinguished by allocating different, and preferably orthogonal, reference signals to them such that all channels from all transmitting antennas to all receiving antennas may be estimated. Systems with MU-MIMO is already a part of the 3GPP standard, release 8.

Single User MIMO (SU-MIMO) is part of the 3GPP standard from release 8 in downlink and release 10 in uplink. Here, one mobile station transmits several streams of data in parallel on the same time and frequency allocation by utilizing several transmit and receive antennas. Both open loop MIMO (without pre-coding) and closed loop MIMO (with pre-coding) are supported.

In existing solution, the antennas, radio circuits and baseband processing are designed and implemented as separate devices. These are connected through high bandwidth interfaces which need much hardware resources, consume much processing power and introduces latency. Between radio and baseband, a time domain signal is distributed, typically based on the CPRI standard. CPRI "Common Public Radio Interface".

What has been described so far is background information for understanding the invention. The invention is based on the realization that there is a need for making a base station modular so that processing may be distributed between different base station modules in order to increase efficiency and flexibility. However, this is somewhat hard to do given the way that signals are processed.

Figure 4:
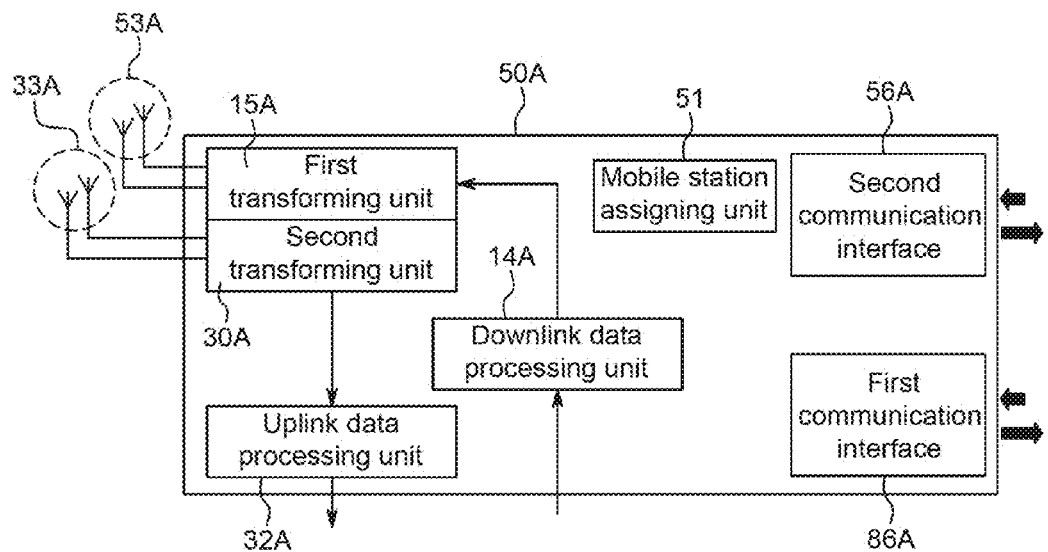
FIG. 4 shows a block schematic of a general base station module according to some variations of the invention.

An illustration is given in FIG. 4 of a base station module with antennas, radio, baseband processing and interfaces to other identical or similar base station modules. The module 50A includes a first and second group of antennas 33A and 53A, where the first group is provided for reception and the second group is provided for transmission of radio signals. The same antenna group might be used both for reception and transmission in case a duplex filter is utilized. The transmitting antennas 53A are connected to a first transforming unit 15A, which in turn is connected to a downlink data processing unit 14A, which is a layer one or physical layer data processing unit, while the receiving antennas 33A are connected to a second transforming unit 30A, which in turn is connected to an uplink data processing unit 32A, which is here also a layer one processing unit. The downlink data processing unit 14A receives user data and codes it for transmission via the transmitting antennas 33A while the uplink data processing unit 32A receives radio signals from the receiving antennas 33A and processes them for transmission to other devices via a communication network such as an LTE communication network. There is also a layer 2 processing unit, i.e. a medium access control and radio link control unit. This unit is also a mobile station assigning unit 51 that assigns mobile stations to the carriers in a communication band. A base station is generally provided through a group of such modules, which are arranged to be communicating with each other via communication interfaces. There is here a first communication interface 86A, which is a lateral uplink communication interface for lateral communication of uplink data and a second communication interface 56A, which is a lateral downlink communication interface for lateral communication of downlink data. It should here be realized that a layer 2 processing unit may exist in all base station modules that form a base station. However, it may also be present in only one.

Figure 5:
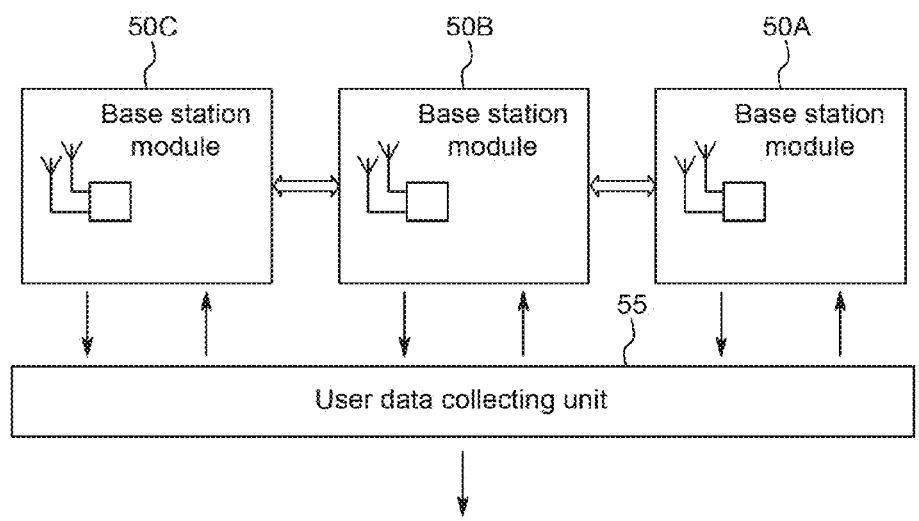
FIG. 5 shows a block schematic of a group of base station modules connected to each other for forming a base station, FIG. 6 schematically shows the communication band of a base station in relation to time.

One such base station module has some basic processing capacity and the capacity may be increased by connecting several modules to each other. The interconnection of three exemplifying modules 50A, 50B and 50C is schematically shown in FIG. 5. Each module here receives user data from the network via a common user data collecting unit 55 and also provides data to the network via this user data collecting unit 55. This unit 55 provides a single interface or connection point to other devices of the communication network that the base station is provided in. The user data collecting unit 55 is thus a common interface for the base station towards other devices, such as devices at higher hierarchical levels of the network, where the base station is being made up of the group of base station modules 50A, 50B, and 50C. In this example there is thus a base station module 50A configured to be part of a group of base station modules comprising this base station module 50A and other base station modules 50B and 50C, which group of base station modules together form a base station. The lateral communication interfaces between the base station modules 50A, 50B and 50C are capable of sharing radio signals between the modules. When increasing the number of base station modules, an increase is achieved in the number of available antennas, the number of radios and the amount of baseband processing. These modules also have interfaces to higher layers in terms of user data (after channel decoding when receiving at uplink on the air interface, and before channel encoding when transmitting at downlink on the air interface).

Figure 6:
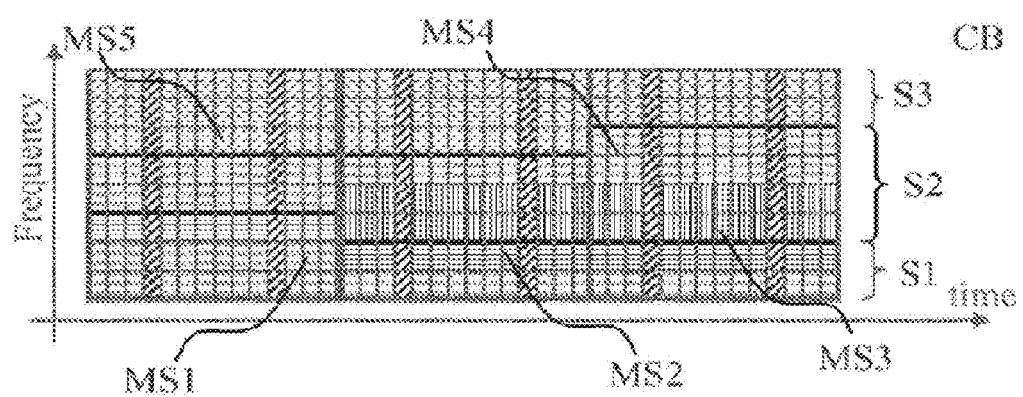

In wireless communications based on OFDM, several mobile stations share the spectrum in a Frequency Division Multiple Access (FDMA) fashion, see illustration in FIG. 6. In this figure the communication band CB of the base station is shown. The communication band CB comprises a number of frequency intervals. Here there are as an example eight frequency intervals. The frequency band CB is here divided for allowing various mobile stations to communicate. The frequency intervals therefore comprise traffic channels mixed with reference signals, which occupy all frequencies at a certain time interval. In the example shown her there are in the time dimension shown three sub-frames, where each sub-frame is as an example made up of fourteen time intervals, where a first, second and third time interval are provided for traffic channels. These are then followed by one time interval, a fourth time interval, of reference signals. Then follows five time intervals, a fifth, a sixth, a seventh, an eighth, a ninth and a tenth time interval, of traffic channels, one time interval, an eleventh time interval, of reference signals and finally three time intervals, a twelfth, thirteenth and fourteen time interval of traffic channels. This is here a first sub-frame, which is followed by a second and a third sub-frame having the same structure. In the frequency dimension there are shown 8 parallel frequency intervals, a first, a second, a third, a fourth, a fifth, a sixth, a seventh and an eighth frequency interval, where there is provided a carrier in each frequency interval ranging from the lowest frequency of the frequency band to the highest frequency of the frequency band. All these frequency intervals may, in the time intervals dedicated to traffic channels, be assigned as channels for communication with mobile stations and in the time intervals dedicated to reference signals all time intervals are used for reference signals.

In the example given here a mobile station uses whole frequency intervals and then at least one whole frequency interval. This is done in order to simplify the description of the present invention. In reality a carrier in a frequency interval may consist of a number of subcarriers, where one subcarrier of a frequency interval may be assigned to a mobile station for use in communication and another subcarrier of the same frequency interval may be assigned to another mobile station. In the example given here there are five different mobile stations MS1, MS2, MS3, MS4 and MS5 communicating in the three sub-frames with the base station. A first mobile station MS1 is here assigned to the first and second frequency intervals in the first sub-frame and to the first frequency interval in the second and third sub-frames, while a second mobile station MS2 is assigned to the third frequency interval in the first sub-frame and to the second frequency interval in the second and third sub-frame. A third mobile station MS3 is not communicating with the base station in the first sub-frame but uses the third and fourth frequency intervals in the second and third sub-frames. A fourth mobile station MS4 is in turn assigned to the fourth and fifth frequency intervals in the first sub-frame, only the fifth frequency interval in the second sub-frame and the fifth and sixth frequency intervals in the third sub-frame. Finally a fifth mobile station MS5 is assigned to the sixth, seventh and eighth frequency intervals in the first and second sub-frames, but only to the seventh and eighth frequency intervals in the third sub-frame.

As can be seen in FIG. 6 the mobile stations may occupy various amounts of the communication band CB in the frequency dimension.

According to the invention, the mobile stations connected with a base station via traffic or communication channels furthermore make up a set of mobile stations. This means that the set of mobile stations are made up of all mobile stations involved in communicating with the base station at least in one direction and preferably both, i.e. in uplink as well as in downlink. According to the invention there is furthermore provided a number of subsets S1, S2 and S3, where a subset of mobile stations are assigned to a base station module. In the example here the first and second mobile stations MS1 and MS2 make up a first subset S1 assigned to the first base station module 50A, the third and fourth mobile station MS3 and MS4 make up a second subset S2 of mobile stations assigned to the second base station module 50B, while the fifth mobile station MS5 makes up a third subset S3 of mobile stations assigned to the third base station module 50C.

A simple calculation of the interface bandwidth requirement between base station modules for one antenna and a 20 MHz carrier follows next.

In the time domain, the antenna data bandwidth requirement is 576 Mbps per antenna and per 20 MHz bandwidth. This is calculated by assuming a sampling rate of 19.2 MHz and a required resolution of 30 bits per sample such that 19.2*30=576.

In the frequency domain, the antenna data bandwidth requirement for the 3GPP physical channels Physical Uplink Shared Channel (PUSCH) and Physical Uplink Control Channel (PUCCH) is 504 Mbps per antenna and per 20 MHz bandwidth. This is calculated by assuming 14 OFDM symbols per 1 millisecond sub-frame, 1200 sub-carriers in each symbol and a required resolution of 30 bits per sample such that 14*1200*30/1 millisecond=504 Mbps. This amount of 14 symbols per 1 millisecond sub-frame is valid for LTE uplink and downlink in case of normal cyclic prefix. In the case of extended cyclic prefix, the number of symbols in each 1 millisecond sub-frame is reduced to 12, resulting in a bandwidth requirement of 12*1200*30/1 millisecond=432 Mbps. Cyclic prefixes are described in more detail in the previously mentioned document 3GPP TS 36.211, "Physical Channels and Modulation" Technical Specification, Group Radio Access Network.

Thus a small reduction in bandwidth is achieved between time and frequency domain interfaces, mainly due to fact that the cyclic prefix is removed. However, since one resource block (RB) is occupied by one mobile station each, or a few mobile stations in the case of MU-MIMO, it should be expected that the amplitude variations between sub-carriers is smaller than the variations of the time domain signals. Thus, a significant reduction in the number of bits per sample may be obtained for a frequency domain interface compared to a time domain interface.

Another aspect of frequency domain interfaces is that the processing may be distributed to different base station modules in terms of frequency intervals allocated to different mobile stations. This means that only those sub-carriers for which a mobile station is allocated are distributed via the lateral communication interface to the base station module that is going to process it. Because different antennas on different base station modules are used, which modules may be placed in locations that are distanced for each other, the possibility to receive and transmit signals of good quality to and from the mobile stations is also enhanced.

The invention will in the following be described in relation to a number of uplink data handling schemes or uplink communication variations as well as a number of downlink data handling schemes or downlink communication variations.

Figure 7:
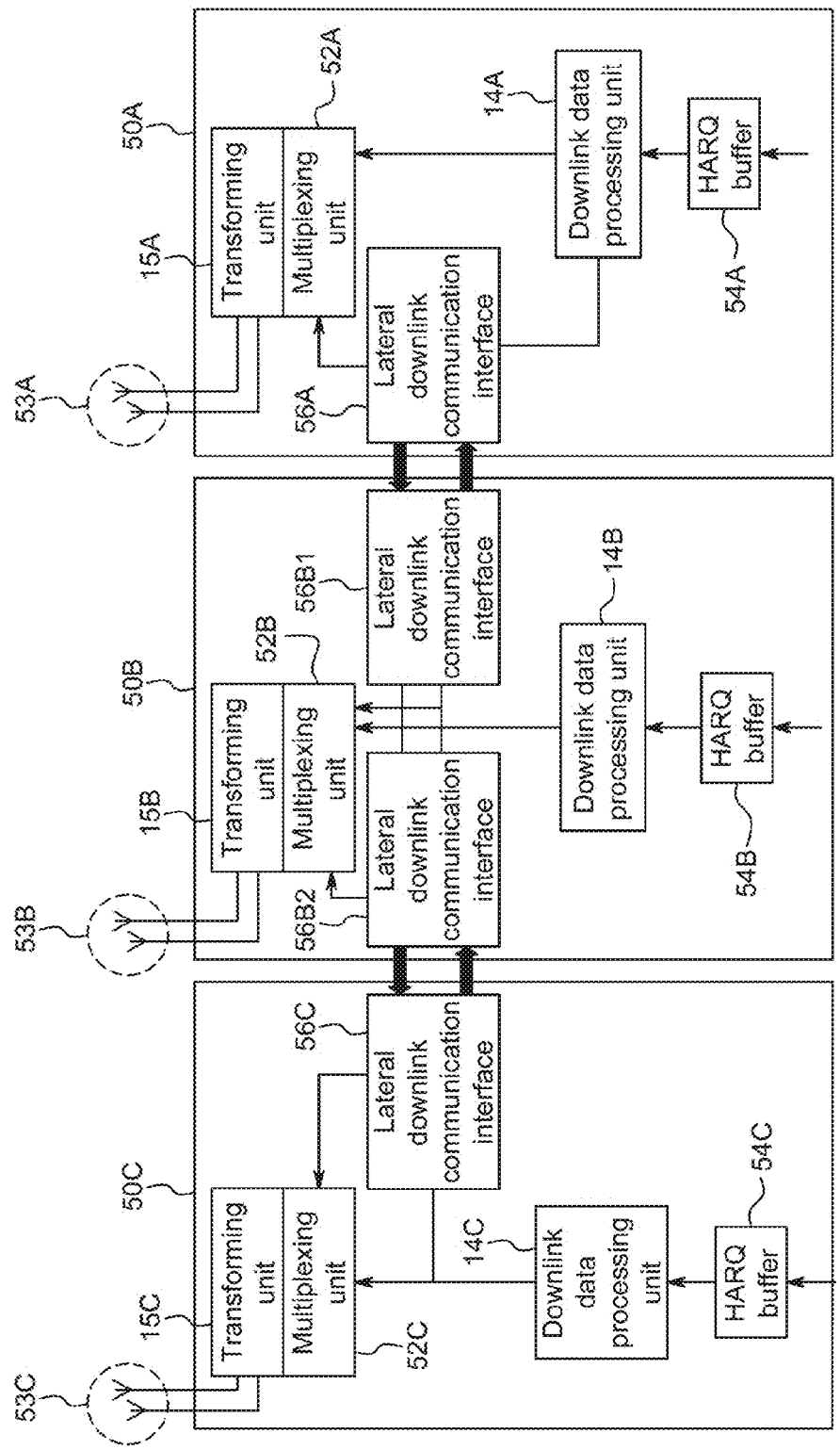
FIG. 7 shows a block schematic of the group of base station modules with units and elements in them for handling downlink communication according to a first downlink communication variation of the invention.

A block schematic of three base station modules 50A, 50B and 50C for handling downlink communication according to a first downlink variation of the invention using lateral downlink communication interfaces 56A, 56B and 56C that are frequency domain interfaces is shown in FIG. 7. Here, each base station module 50A, 50B and 50C comprises a Hybrid Automatic Repeat Request (HARQ) buffer 54A, 54B 54C and a downlink data processing unit 14A, 14B and 14C, which downlink data processing unit comprises the above described channel encoding, modulation and pre-coding functions for a number of mobile stations. For OFDM, the modulated and pre-coded symbols are in the frequency domain. Each base station module furthermore includes a multiplexing unit 52A, 52B and 52C of the previously described type. The downlink data processing unit 14A, 14B and 14C is furthermore connected to at least one lateral downlink communication interface, where the first module has one lateral downlink communication interface 56A, the second module two lateral downlink communication interfaces 56B1 and 56B2 and the third module 50C a single lateral downlink communication interface 56C. A lateral downlink interface is here an interface communicating downlink data laterally, i.e. sideways to another base station module. The interface 56B1 of the second module is provided for communicating with the lateral downlink communication interface 56A of the first module while the communication interface 56B2 is provided for communication with the lateral downlink communication interface 56C of the third module 50C. It should here be realized that more communication interfaces may be provided if a module is to communicate with more than one other module. It is also possible that a module has only one lateral communication interface in order to communicate with several base station modules.

Finally each module is also provided with a transforming unit 15A, 15B and 15C of the previously described of type and arranged to transform radio signal into the time domain. These transforming units are each connected to a corresponding group of transmitting antennas 53A, 53B, 53C, each group comprising at least one antenna.

Figure 8:
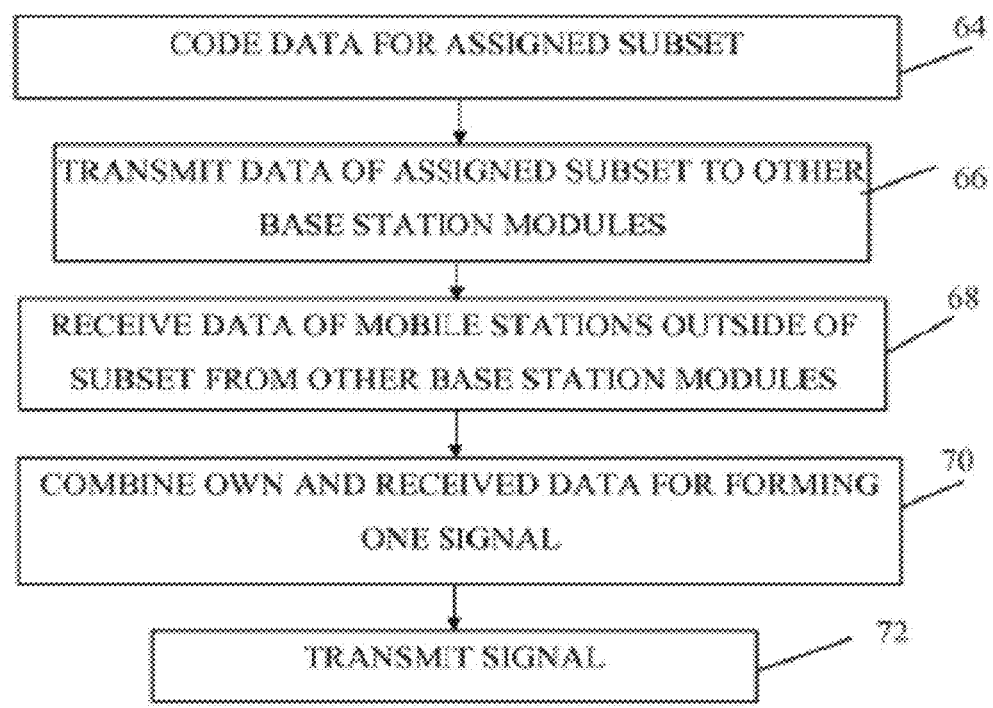
FIG. 8 shows a flow chart of a method for handling downlink communication according to the first downlink communication variation.

The operation of a base station module according to this first downlink communication variation may then be performed according to FIG. 8, which shows a flow chart of a method of operating one module for downlink communication, for instance the first module.

The mobile stations indicated in FIG. 6 may as an example be assigned to the base stations modules 50A, 50B and 50C in the way indicated in that figure. This means that the first subset S1 of mobile stations made up of the first and second mobile stations MS1 and MS2 is assigned to the first base station module 50A, the second subset S2 of mobile station made up of the third and fourth mobile stations MS3 and MS4 is assigned to the second base station module 50B and third subset S3 of mobile stations made up of the fifth mobile station MS5 is assigned to the third base station module 50C. Data intended for the various subsets are here received in the HARQ buffers of the 54C, 54B and 54C of the modules to which the base stations are assigned. This means that data intended for the first and second mobile stations MS1 and MS2 is received in the HARQ buffer 54A of the first module 50A, data intended for the third and fourth mobile stations MS3 and MS4 is received in the HARQ buffer 54B of the second module 50B and data intended for the fifth mobile station MS5 is received in the HARQ buffer 54C of the third module 50C. This data is typically received from a higher order node in the system, such as a mobile services switching centre via the common user data collecting unit 55 shown in FIG. 5. This means that each module only receives user data via the HARQ buffers that is to be transmitted to the assigned subset of mobile stations. This data is then forwarded, in each module, to the corresponding data processing unit 14A, 14B and 14C, where the data for the assigned subset of mobile stations is coded, step 64. The coding is performed in order to send the radio signals to the assigned subset of mobile stations. The processing here involves channel encoding, modulation and pre-coding and the resulting symbols are here provided in the frequency domain.

The frequency domain samples are then provided to the multiplexing units 52A, 52B and 52C as well as to the lateral downlink communication interfaces 56A, 56B1, 56B2 and 56C via which interfaces they are distributed to the other base stations modules. The communication interfaces of each base station module thus transmits data of mobile stations in the assigned subset to the other base station modules in the group, step 66. As each base station module does this it can also be seen that the communication interfaces of each base station module also receives data of the mobile stations outside of the subset assigned to it from the other base station modules in the group, step 68, i.e. data concerning the mobile stations in the subset assigned to the other base station modules of the group. This means that the first base station module 50A sends data, in the form of frequency domain samples, relating to the first and second mobile stations MS1 and MS2 to the second and third base station modules 50B and 50C and receives data, also here in the form of frequency domain samples, relating to the third and fourth mobile stations MS3 and MS4 from the second base station module 50B as well as data relating to the fifth mobile station MS5 from the third base station module 50C. All this data is in the first base station module 50A received and transmitted via the lateral downlink communication interface 56A. The other base station modules 50B and 50C operate in the same manner.

The data received via the communication interfaces 56A, 56B1, 56B2 and 56C in each base station module is then also forwarded to the corresponding multiplexing unit 52A, 52B and 52C, where the own and received data, here in the form of the own and received frequency domain samples, are combined for forming a radio signal, step 70. In this first downlink variation of the invention the combining is made using multiplexing. In this way each base station module forms at least one signal that is made up of data to be transmitted to all mobile stations in the set, i.e. to all five mobile stations in a time interval and on traffic channels in various frequency intervals of the communication band CB. It can thus be seen that the frequency domain symbols of a base station module are multiplexed with frequency domain symbols from other base station modules. The frequency domain samples for each mobile station are thus distributed to all base station modules where they are multiplexed. The signals are here still in the frequency domain and therefore each signal is provided as input to the corresponding transforming unit 15A, 15B and 15C, where it is transformed into the time domain, for instance using an IFFT transformation. Each signal is then forwarded to the associated transmission antennas 53A, 53B and 53C from where it is transmitted to the mobile stations, step 72.

As processing of signals are performed only in relation to one base station module, it is possible to simply keep the downlink data processing unit of this module idle if no mobile stations are assigned to it. It is also possible that the antennas are not used and therefore it is also possible to keep the multiplexing unit idle.

Figure 9:
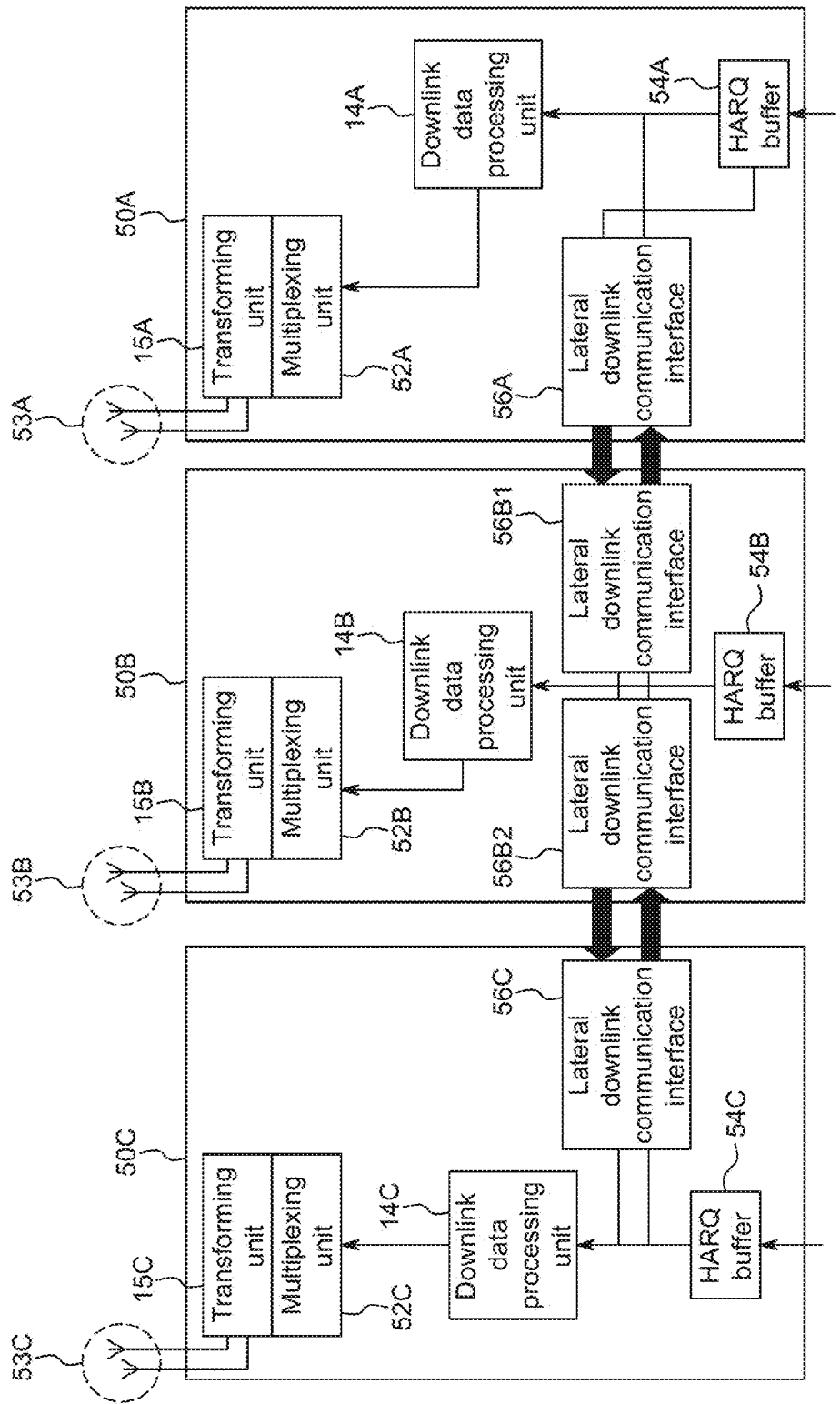
FIG. 9 shows a block schematic of the group of base station modules and units in them for handling downlink communication according to a second down link communication variation of the invention.
Figure 10:
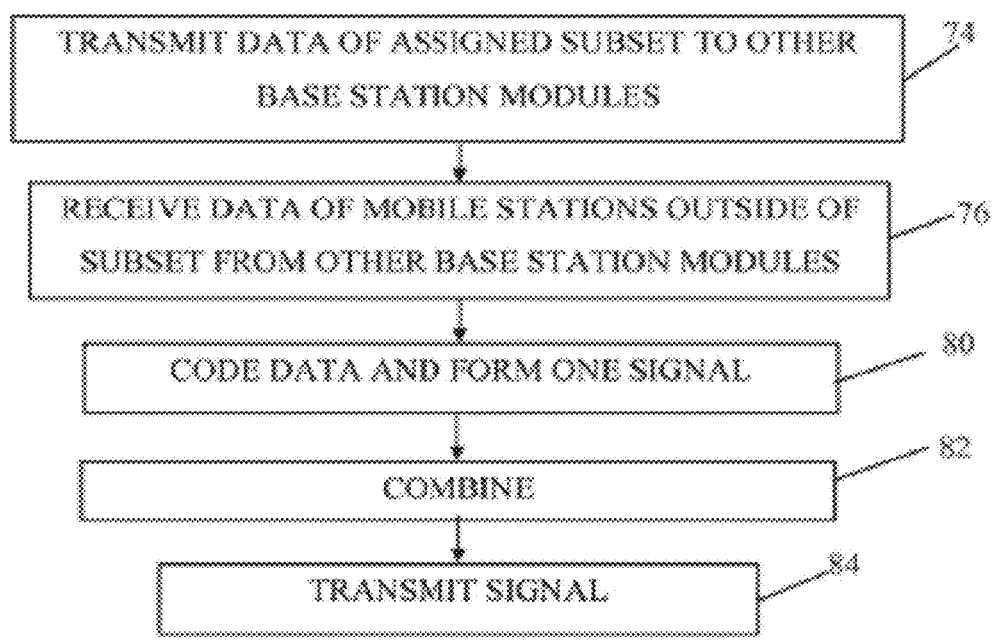
FIG. 10 shows a flow chart of a method for handling downlink communication according to the second of downlink communication variation.

A second variation of downlink processing is shown in FIGS. 9 and 10. The difference is here that the lateral downlink communication interfaces are connected between HARQ buffers 54A, 54B and 54C and downlink data processing units 14A, 14B and 14C instead of being connected between the downlink data processing units and combining units like in the first downlink variation. This means that the lateral downlink communication interfaces transmit data in the form of non-coded and non-modulated data of the assigned subset to the other base station modules, step 74, and receives non-coded and non-modulated data outside of the assigned subset from the other base station modules, step 76. Each data processing unit 14A, 14B and 14C here processes, i.e. codes and modulates, the non-coded and non-modulated data for forming a signal in the frequency domain, step 80, which signal thus covers the whole communication band. The signal is then provided to the multiplexing unit 52A, 52B and 52C, which performs combination through multiplexing, step 82, followed by transforming it into the time domain by the transforming unit 15A, 15B and 15C and transmission via the transmission antennas 53A, 53B and 53C, step 84. Here, each base station module performs encoding, modulation and pre-coding of all mobile stations and thus calculates all frequency domain symbols. A very low load is now achieved on the communication interfaces between the modules, since only the user data needs to be distributed. However, this architecture implies that the same processing is repeated in all base station modules. Compared to the architecture in FIG. 7, much more baseband hardware and processing are needed in the architecture of FIG. 9. The baseband is, with this architecture, not modular in the sense that the capacity increases when adding more devices. Here it can also be mentioned that in the second downlink communication variation, the multiplexers may be omitted from the modules.

Figure 11:
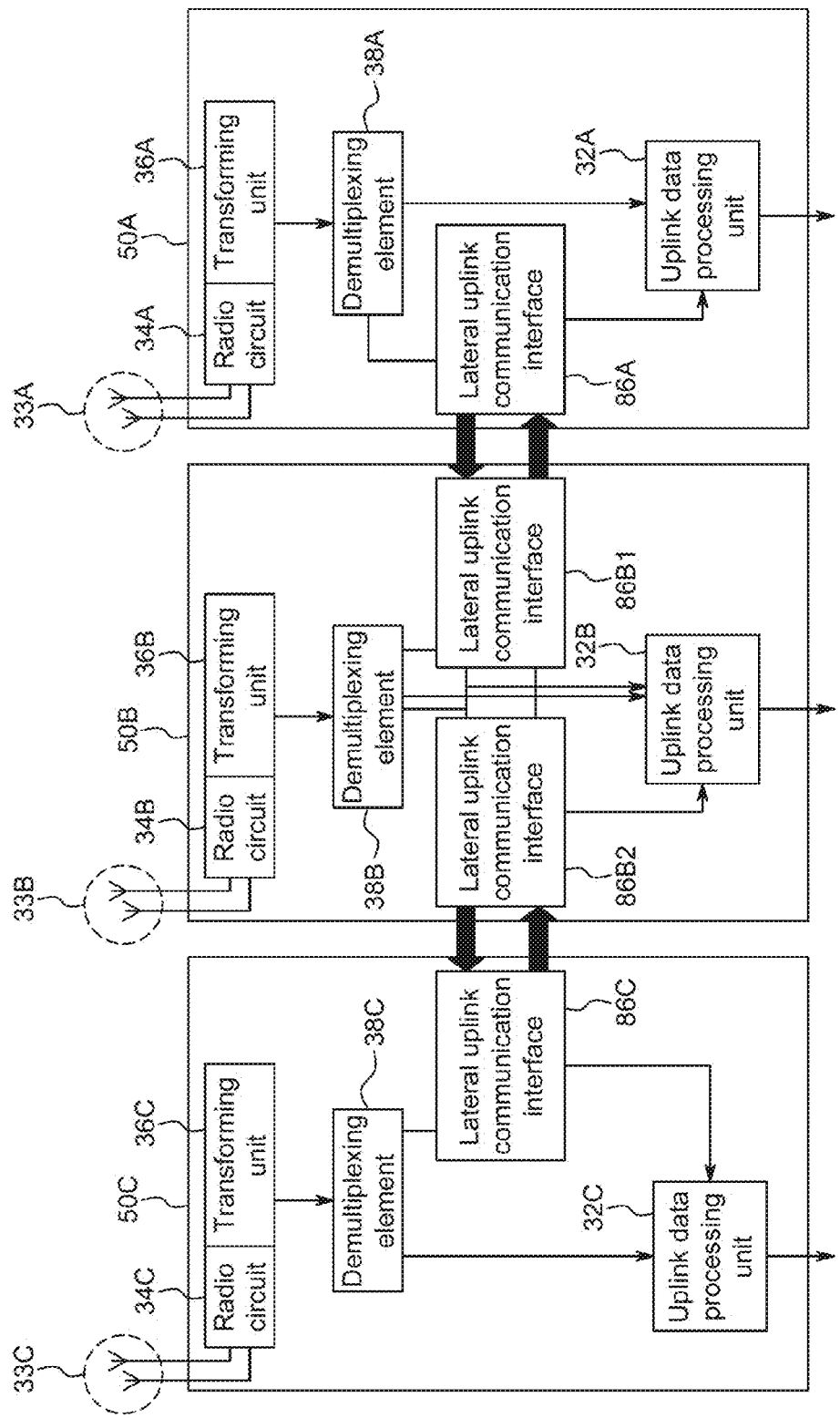
FIG. 11 shows a block schematic of the group of base station modules and units in them for handling uplink communication according to a first uplink communication variation of the invention.

An illustration of a first variation of LTE uplink processing is given in FIG. 11. Here each base station module 50A, 50B and 50C comprises a group of receiving antennas 33A, 33B and 33C connected to a transforming unit 36A, 36B and 36C via a radio circuit 34A, 34B and 34C. The group includes at least one antenna for receiving radio signals from mobile stations in the base station communication band. The transforming unit is connected to a data handling unit, which in turn is connected to a at least one lateral uplink communication interface 86A, 86B1, 86B2 and 86C as well as to an uplink data processing unit 32A, 32B and 32C. A lateral uplink communication interface is here an interface communicating uplink data laterally, i.e. sideways to another base station module. As in the downlink variations the first base station module 50A has one lateral uplink communication interface 86A, the second base station module 50B has two lateral uplink communication interfaces 86B1 and 86B2 and the third base station module 50C has one lateral uplink communication interface 86C. The interface 86B1 of the second module is provided for communicating with the communication interface 86A of the first module while the communication interface 86B2 is provided for communication with the communication interface 86C of the third module 50C. The same type of modifications that were made in the downlink variations may also be made here, i.e. that each module only has one or may have two interfaces depending on how many base station modules are included in the group. The data handling unit is configured to select data for transfer to the other base station modules in the group and comprises, in this first uplink variation of the invention, a demultiplexing element 38A, 38B and 38C. Each uplink data processing unit here provides data to the common user data collecting unit 55 for transmission to other device such as for instance the previously described mobile services switching centre.

It should be realized that the radio circuit may be integrated with the receiving antennas.

Figure 12:
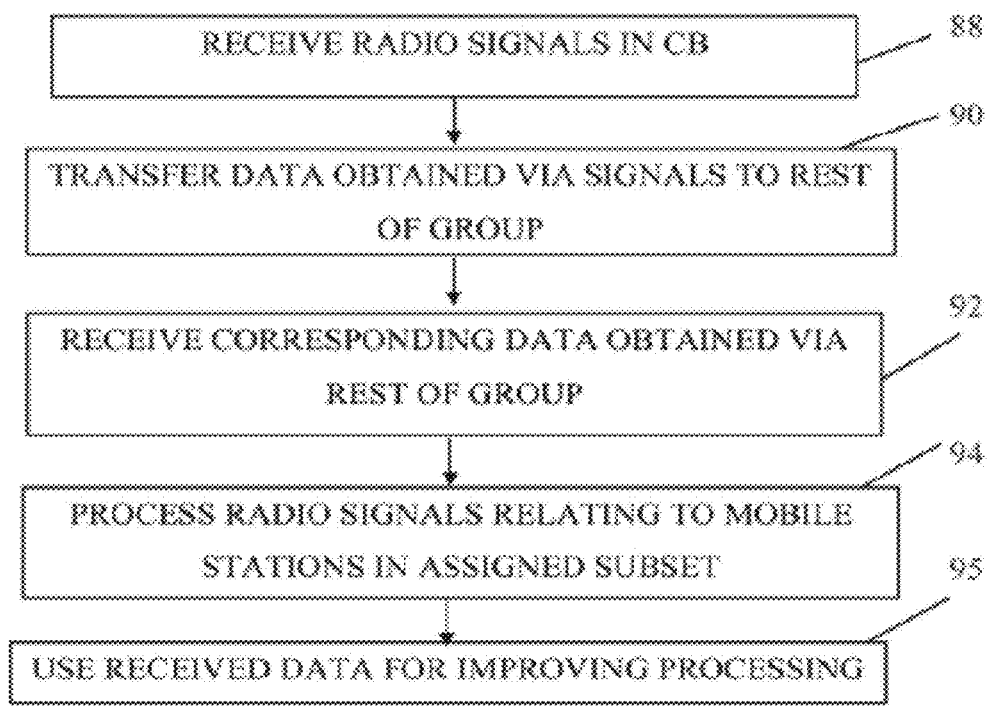
FIG. 12 shows a flow chart of a general method for handling uplink communication in a base station module.

The general functioning of uplink processing in a base station module is generally shown in the flow chart in FIG. 12. In a module radio signals in the whole communication band are received, step 88, and data is then separated from these signals that are to be transferred to the base station modules of the rest of the group. The separation is based on the subset assignments that have been made of mobile stations to the base station modules. The data to be transferred may here be data concerning channels used by the mobile stations in subsets assigned to the other base station modules, i.e. to data associated with mobile stations outside of the subset assigned to the specific base station module. It may also be data concerning the mobile stations in the own subset. The data is then transferred to the other base station modules in the group via the lateral uplink communication interfaces, step 90, and corresponding data obtained by the other base station modules is received via the laterasl uplink communication interfaces, step 92. Corresponding data may here be complementing data. If for instance data regarding mobile stations outside the assigned subset is transferred to the other base station modules, then the received data may be data concerning the assigned subset or vice versa. The radio signals relating to the assigned subset of mobile stations are then processed in the uplink data processing unit, step 94. In this processing the data received from the other base station modules of the group is then used by the base station module to influence the processing in order to improve it, step 95. Thereafter data obtained through said processing is provided via the common user data collecting unit 55 to a receiving entity in the communication network. The user data collecting unit thus collects user data from the base station modules, which user data originates in the mobile stations, and forwards this data to other devices in the network.

Figure 13:
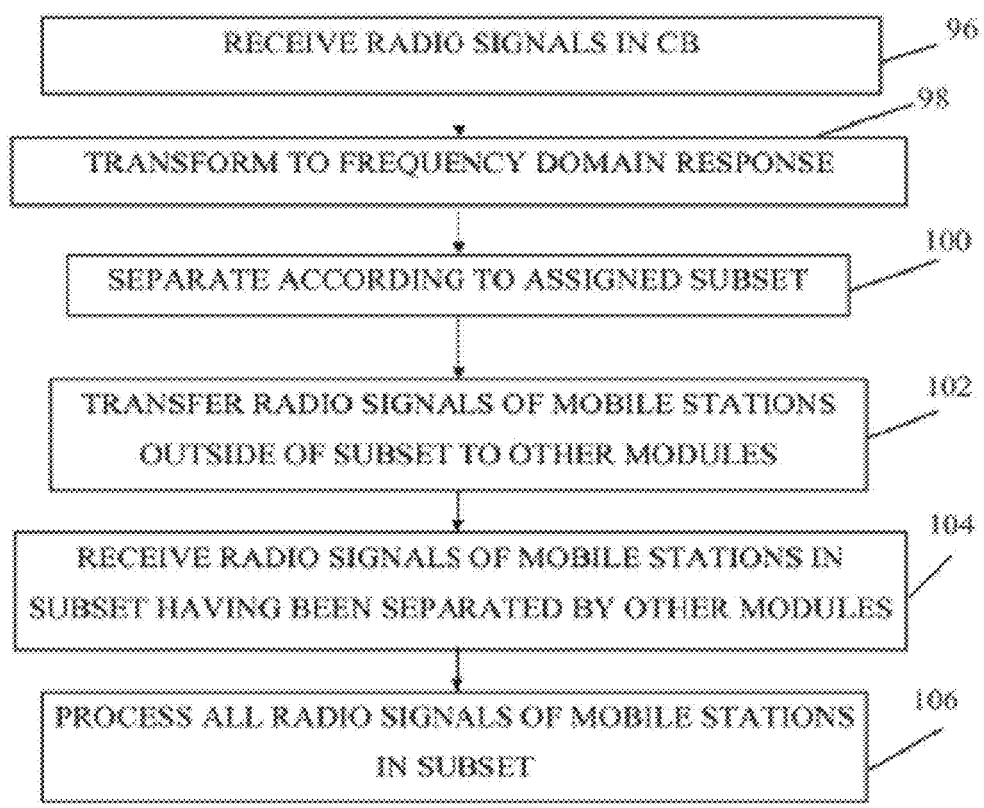
FIG. 13 shows a flow chart of a method for handling communication in a base station module according to the first uplink communication variation.

In the specific first variation shown in FIG. 11 the uplink processing may more particularly be performed as outlined in the flow chart in FIG. 13. The radio signals are here received in the communication band via the receiving antennas 33A, 33B and 33C and radio circuit 34A, 34B and 34C, step 96, and provided to the transforming unit 36A, 36B and 36C, which may be an FFT unit. The transforming unit 36A, 36B and 36C then transforms the received radio signals into the frequency domain, step 98. The transformed signal is then supplied to the corresponding demultiplexing element 38A, 38B and 38C, where parts of the received signal is selected for transmission to the other base station modules in the group. In this first variation the selection is a selection according to assigned subset. The demultiplexing element 38A, 38B and 38C thus separates the received radio signals into a first radio signal group of radio signals relating to the assigned subset of mobile stations and a second radio signal group of radio signals not relating to the assigned subset of mobile stations, i.e. to the subset of mobile stations assigned to the other base station modules. The demultiplexing element of a base station module therefore separates the channels including data of the mobile stations in the assigned subset from the data of the mobile stations assigned to the rest of the base station modules, step 100, where the data in the channels of the own subset, i.e. in the first radio signal group of radio signals, is provided to the uplink data processing unit 32A, 32B and 32C, while the data in channels outside of the subset, i.e. in the second radio signal group of radio signals, is transferred to the communication interface 86A, 86B1, 86B2 and 86C for transfer to the rest of the base station modules in the group. As all the base station modules does this it can be seen that they each transfer radio signals in the frequency domain of mobile stations outside of their own subset to the other base station modules, step 102, and receive data of mobile stations in their own subset from the rest of the base station modules, step 104. The received data is then transferred to the own uplink data processing unit 32A, 32B and 32C and processed with the own separated data, step 106. The uplink data processing device thus processes the radio signals of the original subset of mobile stations received by all base station modules.

Thus in this first variation the signal from each antenna group 33A, 33B and 33C is fed to an FFT unit 36A, 36B and 36C producing frequency domain samples. These, samples are de-multiplexed by the demultiplexing element 38A, 38B and 38C such that the frequency interval which should be processed on a specific base station module are extracted from all antennas and gathered on that base station module for layer 1 or baseband processing.

Figure 14:
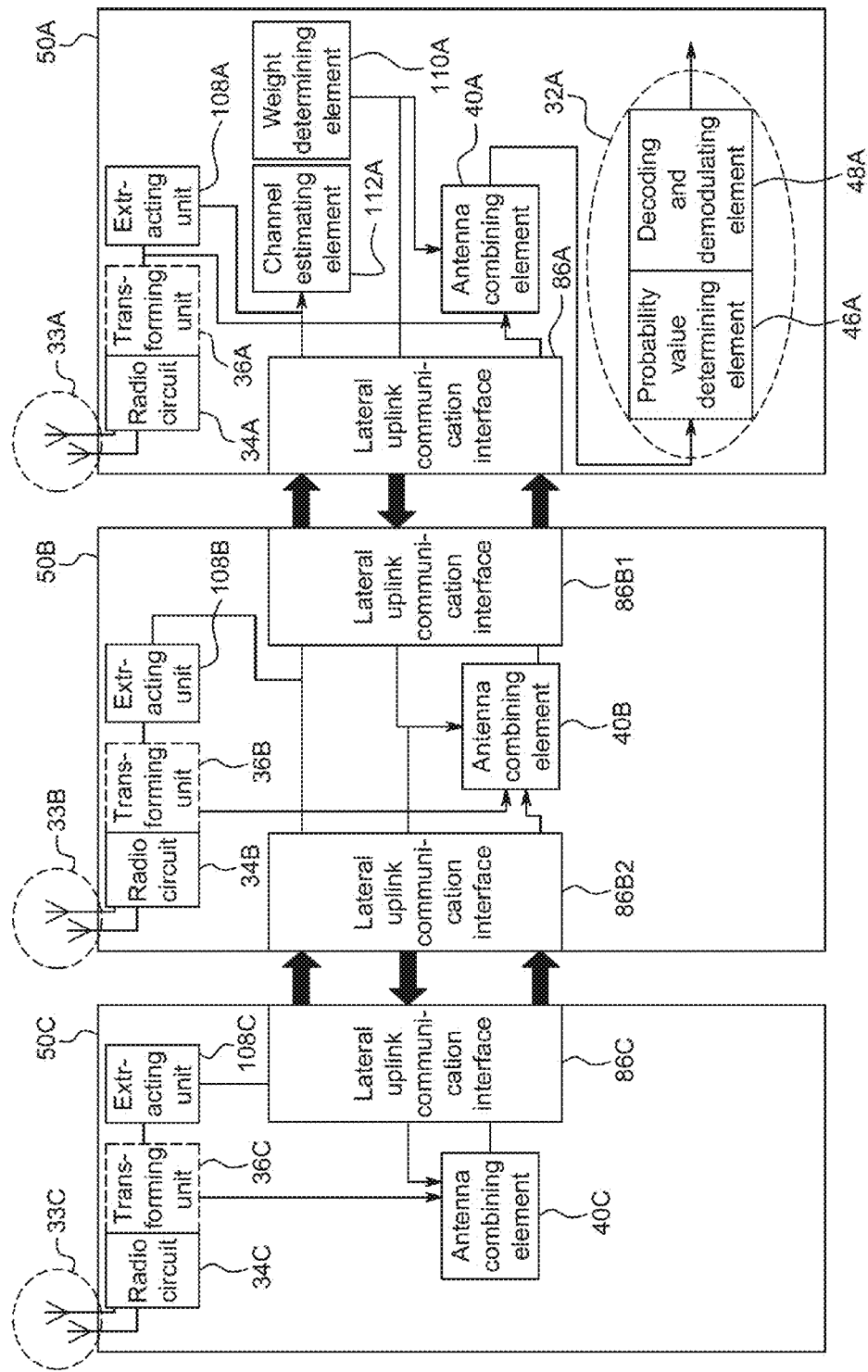
FIG. 14 shows a block schematic of the group of base station modules and units in them for handling uplink communication according to a second uplink communication variation.
Figure 15:
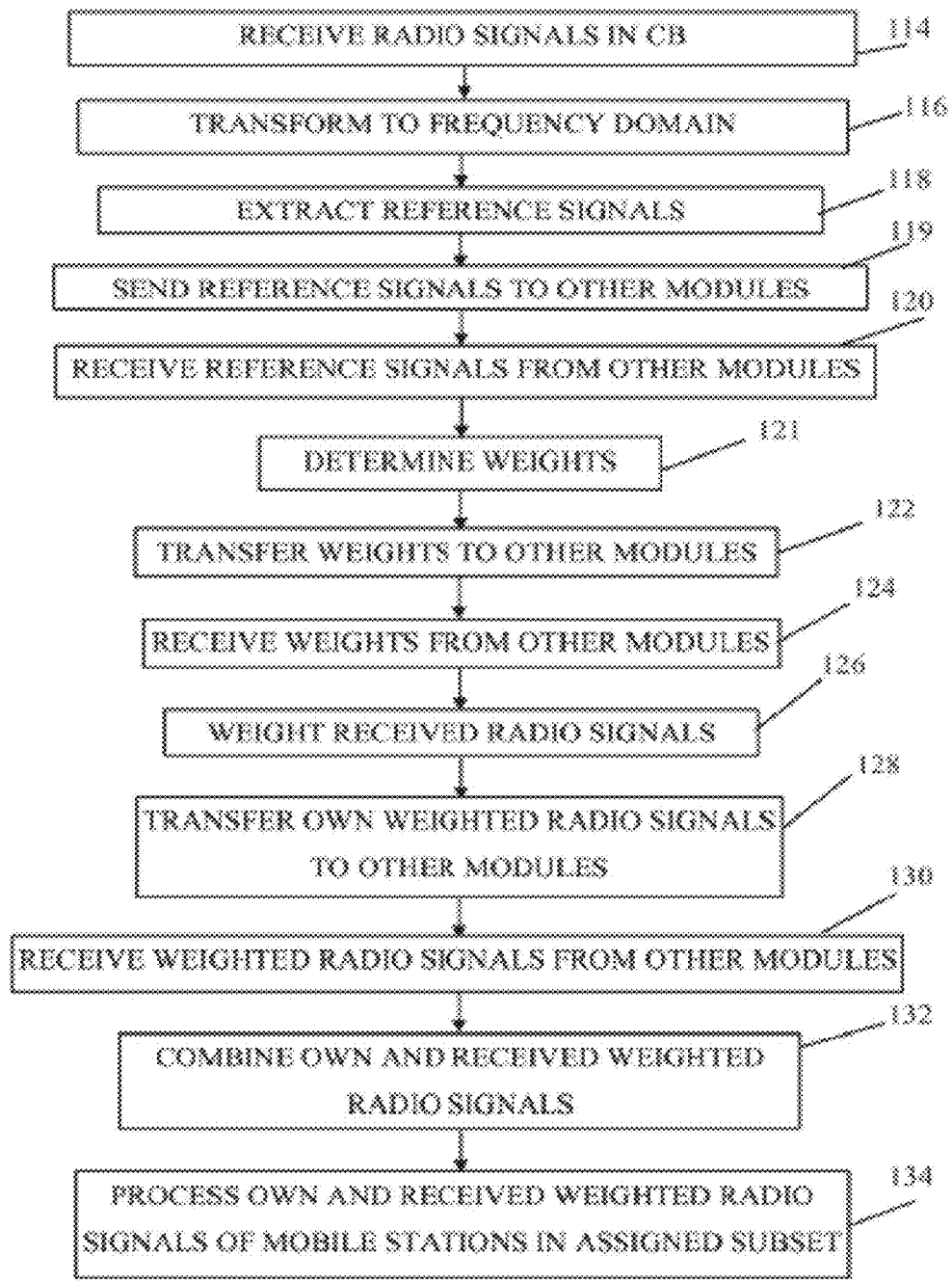
FIG. 15 shows a flow chart of a method for handling communication in a base station module according to the second uplink communication variation.

A slightly modified architecture of a second uplink processing variation is given in FIG. 14 together with the flow chart in FIG. 15.

In FIG. 14 each module has a transforming unit 36A, 36B and 36C connected to receiving antennas 33A, 33B and 33C via radio circuit 34A, 34B and 34C as well as connected to the lateral uplink communication interfaces 86A, 86B1, 86B2 and 86C just as in the first uplink variation. However according to this second variation the data handling unit of each module also includes an antenna combining element 40A, 40B and 40C as well as an extracting unit 108A, 108B and 108C. Here the extracting unit 108A, 108B and 108C of a module is connected between the corresponding transforming unit 36A, 36B and 36C and lateral uplink communication interface 86A, 86B1, 86B2, 86C. The transforming unit 36A, 36B and 36C of a module is also connected to the corresponding antenna combining element 40A, 40B and 40C, which is in turn also connected to the lateral uplink communication interfaces 86A, 86B1, 86B2 and 86C of the module. Each module also includes an uplink data processing unit comprising a symbol probability value determining element and decoding and demodulating element. In FIG. 14 only the uplink data processing unit 32A including a probability value determining element 46A and decoding and demodulating element 48A of the first module is shown. However, it should be realized that these types of units and elements are also present in the second and third modules.

In FIG. 14 the first module 50A is also shown as comprising a channel estimating element 112A and a weight determining element 110A connected to each other as well as to the communication interface 86A. The channel estimating element 112A is also connected to the extracting unit 108A and the weight determining element 110A to the antenna combining element 40A. Also the second and third modules include these elements, but they have been omitted for the reason of providing a clearer description of the invention.

In this second uplink communication variation, the channel estimating element, weight determining element and antenna combining element together make up a data handling unit that selects data to be transferred to the other modules.

The functioning of the first module 50A in this second uplink variation will now be described with reference to FIG. 15, which shows a corresponding flow chart. The radio signals in the communication band CB are here received via the receiving antennas 33A and radio circuit 34A, step 114, and provided to the transforming unit 36A. The transforming unit 36A then transforms the received radio signals into the frequency domain, step 116. The transformed signal is then supplied to the extracting unit 108A, which extracts the subcarriers and symbols corresponding to reference signals that correspond to the subcarriers and carriers used by the subset of mobile stations assigned to the first base station module 50A, step 118. The extracted signals are here signals characterising the channels used by the first and second mobile stations MS1 and MS2 of the assigned subset S1 that are provided in reference signals. These extracted reference signals are then sent to the channel estimating element 112A. The extracting unit 108A also extracts reference signals corresponding to the channels used by the mobile stations in the second and third subsets S2 and S3 assigned to the second and third base station modules 50B and 50C and sends these reference signals to the channel estimating elements of these modules, step 119.

The channel estimating element 112A in this way receives reference signals obtained via the receiving antennas 33A, i.e. it receives reference signal data representing the reference signals corresponding to the channels used by assigned subsets of mobile stations, and performs channel estimation on these. This channel estimating element 112A also receives, from the other base station modules 50B and 50C in the group, via the lateral communication interfaces 86C, and 86B1 and 86A, reference signals corresponding to the channels used by the assigned subset of mobile stations, step 120. These reference signals have been extracted by extracting units 108B and 108C from radio signals received by the receiving antennas 33B and 33C and radio circuits 34B and 34C and transformed into the frequency domain by the transforming elements 36B and 36C. The weight determining element 110A then determines weights for radio signals for the channels used by the subset of mobile stations assigned to the base station module 50A, step 121, which weigths are determined based on the channel estimation and thus also on the data that characterises channels. Such weights are determined for all reference signals associated with the assigned subset S1. The weights determined for the reference signals received from the other base station modules 50B and 50C are then transferred to these base station modules 50B and 50C, step 122, the antenna combining elements 40B and 40C of which then uses these received weights for applying on the channels of the subset S1 of mobile stations assigned to the first base station module 50A, while the own weights determined for this subset with regard to the radio signals received via the receiving antennas 33A are transferred to the own antenna combining element 40A.

The second and third base station modules 50B and 50C operate in the same way in relation to the subset of mobile stations assigned to them. These modules thus include weight determining elements determining weights for the channels of their own subsets of mobile stations. They therefore transfer weights for these channels determined for the radio signals received by the first base station module 50A to the antenna combining element 40A via the lateral communication interfaces 86C and 86B1. The antenna combining element 40A thus receives these weights via the lateral communication interface 86A, step 124.

This means that the antenna combining element 40A of the first base station module receives weights concerning the channels used by the subset S1 directly from the weight determining element 110A and concerning the channels used by subsets S2 and S3 via the lateral communication interface 86A. At the same time the antenna combining elements 40B and 40C receives weights concerning the subset S1 from the weight determining element 110A via the lateral communication interfaces 86B1 and 86C, respectively. The antenna combining element 40A then weights the own radio signals, step 126.

Also the antenna combining elements of the second and third base station modules in the same way weights their received radio signals using received and determined weights.

The antenna combining element 40A of the first base station module 50A then transfers the weighted radio signals to the two other base station modules via communication interface 86A, step 128, and receives weighted radio signals from the antenna combining elements 40B and 40C of the two other base station modules 50B and 50C, step 130, and combines the own and received weighted radio signals, step 132. The thus combined signals are then provided to the uplink data processing unit 32A, where own and received weighed radio signals in the channels used by the assigned mobile stations are processed, step 134. This involves the probability value determining element 46A determining probabilities of received symbol values in the form of soft values and the decoding and demodulating element 48A decoding and demodulating data in the channels used by the mobile stations assigned to the first base station module.

In the same way, the antenna combining elements 40B and 40C combine own weighted and received radio signals and provides combined signals to corresponding uplink data processing units being set to process data in the channels of their associated subsets of mobile stations.

As can be seen only the sub-carriers and symbols corresponding to the reference signals are distributed between the base station modules. The amount of data distributed between the base station modules is thereby reduced compared with the first uplink communication variation. The frequency and time intervals corresponding to reference signals for the mobile stations which are allocated to a specific base station module are extracted from all antennas and used in determining weights by a local weight determining unit. Here the amount of data to gather grows with number of antennas. Each base station module calculates channel estimates and antenna combining weights corresponding to the mobile stations that are allocated to it. Antenna combining weights are thus calculated for each mobile station, stream and receiver radio signal and distributed to each base station module that has received a radio signal. The radio signals were here also (coherently) added after multiplication of the radio signal with the antenna combining weights. These combined signals, in the frequency domain, from all base station modules were then gathered to the base station module which calculated soft values and channel decoding. The amount of gathered radio signals grows with the number of streams. Since radio signals from all base station modules are combined, the processing is still very reliable.

In FIG. 14, only the baseband processing of the frequency intervals (and corresponding mobile stations) allocated to the first base station module 50A were indicated. However, different frequency intervals (and mobile stations) are allocated to all base station modules. It should be desirable to distribute the processing between the base station modules such that the hardware is utilized in the best possible way.

It can thus be seen that the following steps were followed:
Gather reference symbols from all antennas
Calculate channel estimates and antenna combining weights
Distribute antenna combining weights
Combine radio signals using the antenna combining weights, and
Gather antenna combined user data.

The antenna combining may be done in a cascaded architecture, as is also illustrated in FIG. 14, where the combined frequency domain signal for one mobile station is distributed from the third base station module 50C to the second base station module 50B where the radio signals from that base station module are multiplied with its corresponding antenna weights and then added to the combined signal from the third base station module. The new combined signal is further distributed to the first base station module, where the own radio signal is added and the resulting radio signal is provided to the uplink data processing unit 32A which calculates soft values and performs channel decoding.

Figure 16:
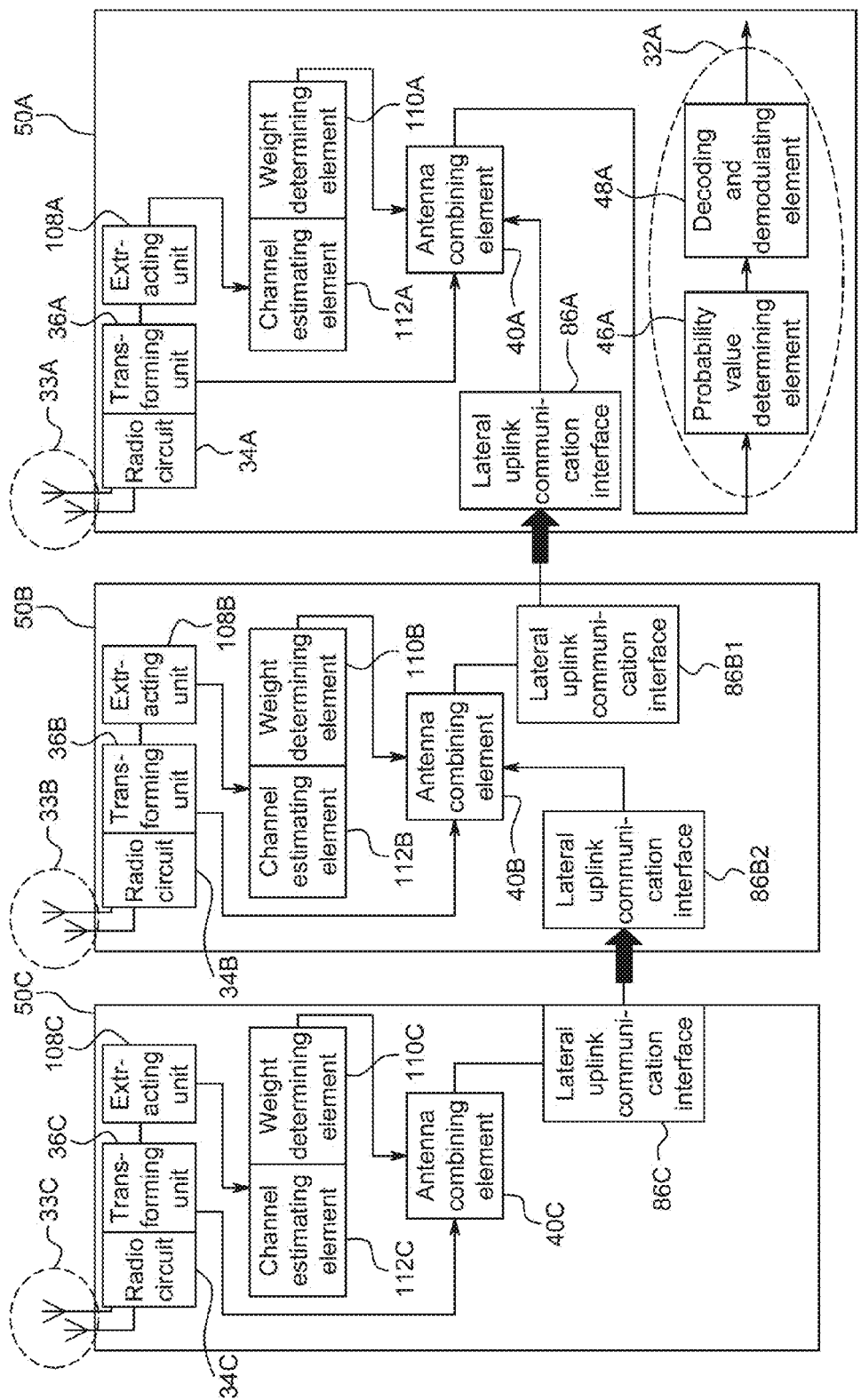
FIG. 16 shows a block schematic of the group of base station modules and units in them for handling uplink communication according to a third uplink communication variation of the invention.

In yet another alternative architecture a third uplink variation is given in FIG. 16. Here there is a transforming unit 36A, 36B and 36C connected to receiving antennas 33A, 33B and 33C via radio circuits 34A, 34B and 34C, extracting unit 108A, 108B and 108C and antenna combining element 40A, 40B and 40C, where the antenna combining elements are connected to lateral uplink communication interfaces 86A, 86B1, 86B2 and 86C. Each base station module also comprises its own channel estimating element 112A, 112B and 112C as well as its own weight determining element 110A, 110B and 110C. These units and elements are thus provided in the same way as in the second variation. There are also symbol probability value determining elements 46A and decoding and demodulating elements 48A as in the second variation. However, here the data handling unit selecting data to be transferred to the other modules is made up of the antenna combining element.

The difference here is therefore that the weights are not distributed. Instead the weight determining unit of a base station module keeps the weights it determines within the base station module. The weights are then used on the locally received radio signal and the locally weighted radio signal is then combined with radio signals from the rest of the base station modules in the group in the same way as in the second uplink variation. With the architecture of FIG. 16, a performance loss is expected compared to the architecture of FIG. 14 and FIG. 11. This since the channel estimate and antenna weight calculations are not performed jointly for all antennas, resulting in less interference rejection.

Figure 17:
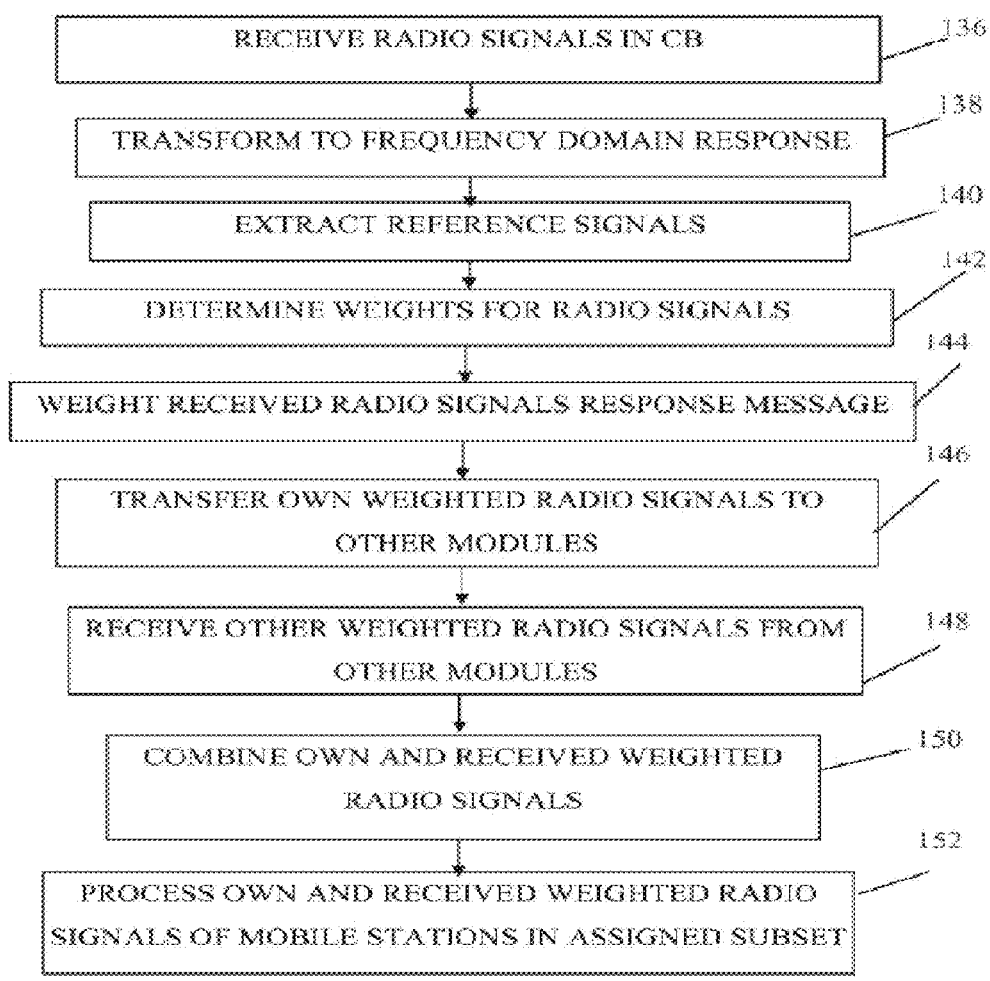
FIG. 17 shows a flow chart of a method for handling communication in a base station module according to the third uplink communication variation.

The method steps being performed in a base station module, for instance the first base station module 50A, of the third uplink variation are shown in FIG. 17 and are performed in the following way. The radio signals in the communication band CB are received via the receiving antennas 33A and radio circuit 34A, step 136, and provided to the transforming unit 36A. The transforming unit 36A then transforms the received radio signals into the frequency domain, step 138. The radio signal is then supplied to the extracting unit 108A, which extracts, from the reference signals of the communication band, the sub-carriers and symbols corresponding to reference signals that correspond to the subcarriers and carriers used by the subset of mobile stations assigned to the first base station module 50A, step 140. The extracted reference signals are then sent to the channel estimating element 112A.

The channel estimating element 112A then performs channel estimation and provides channel estimates to the weight determining unit 110A, which goes on and determines antenna weights for all the channels used by the subset of mobile stations, i.e. for the channels used by the first and second mobile station MS1 and MS2 based on the channel estimation, i.e. in relation to the radio signal received via the local antennas 33A. The weights are then sent to the antenna combining element 40A, which weights the radio signals received in the base station module 50A with the received weights, step 144. The antenna combining element 40A also transfers the own weighted radio signals to the two other base station modules via communication interface 86A, step 146, and receives corresponding weighted radio signals from the antenna combining elements 40B and 40C of the two other base station modules 50B and 50C, step 148, and combines the own and received weighted radio signals, step 150. The thus combined signals are then provided to the uplink data processing unit 32A where own and received weighted radio signals in the channels used by the assigned mobile stations are processed, step 152. This means that the probability value determining element 46A determines probabilities of received symbol values in the form of soft values and the decoding and demodulating element 48A decodes and demodulates data in the channels used by the mobile stations assigned to the first base station module.

In FIG. 16 only the baseband processing of the frequency intervals (and corresponding mobile stations) allocated to one base station module was illustrated. However, different frequency intervals (and mobile stations) are allocated to all base station modules. Therefore the second and third base station modules perform the same type of processing for the subset of mobile stations assigned to them. It should be desirable to distribute the processing between the modular devices such that the hardware is utilized in the best possible way. This reduces the amount of data transmitted between modules considerably at the expense of a slight degradation of the processing reliability. The steps involved in FIG. 16 may therefore also be summarized as All base station modules calculate channel estimates and antenna combining weights for those antennas belonging to that base station module, Radio signals on each base station module are combined using the antenna combining weights, and Antenna combined user data is gathered.

Figure 18:
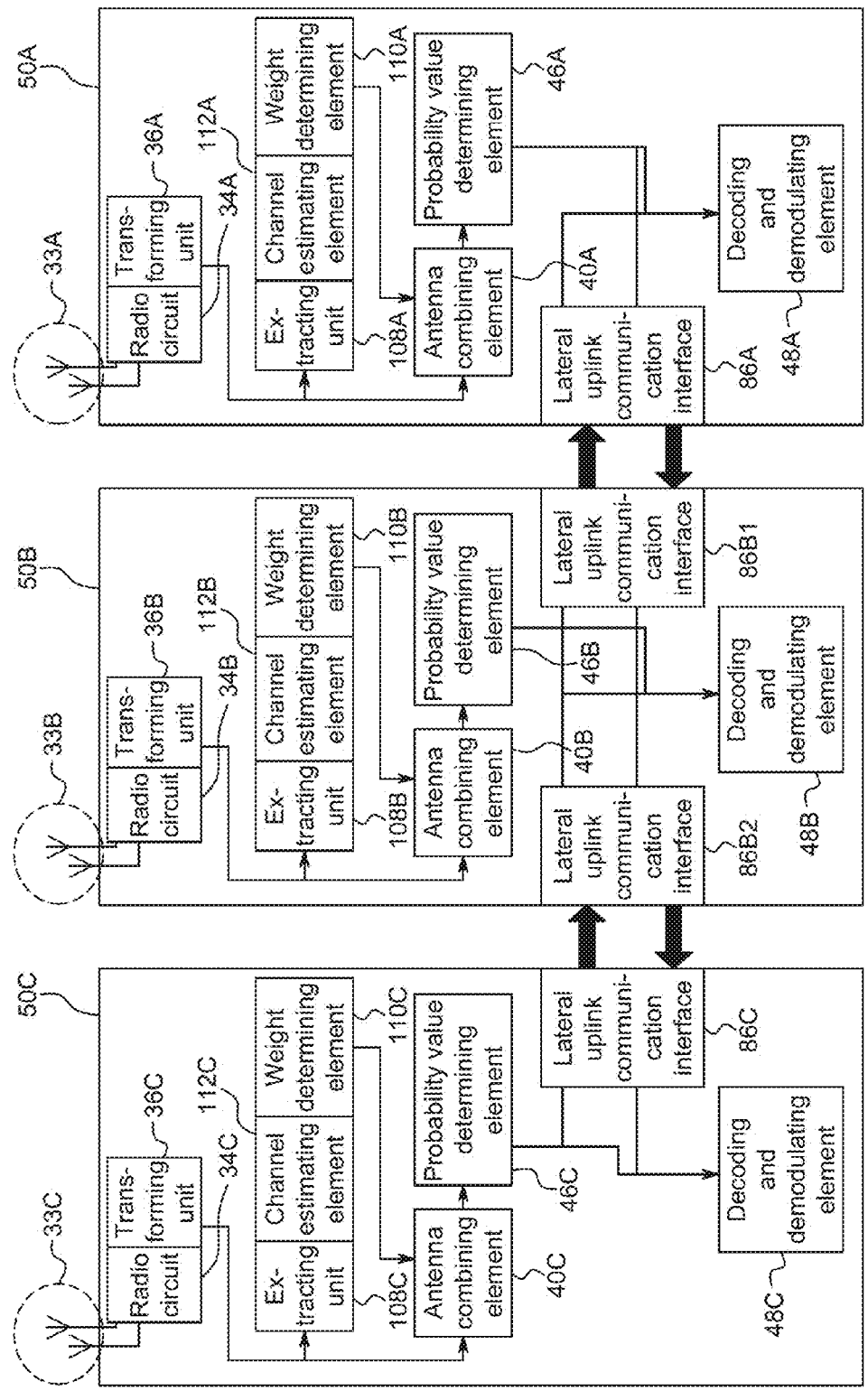
FIG. 18 shows a block schematic of the group of base station modules and units in them for handling uplink communication according to a fourth uplink communication variation of the invention.

In FIG. 18 there is shown a fourth uplink variation. Here there is a transforming unit 36A, 36B and 36C connected to receiving antennas via radio circuit 34A, 34B and 34C, extracting unit 108A, 108B and 108C, antenna combining element 40A, 40B and 40C, channel estimating elements 112A, 112B and 112C as well as weight determining elements 110A, 110B and 110C in the same way as in the third uplink variation. There is also a symbol probability value determining element 46A, 46B and 46C, a decoding and demodulating element 48A, 48B and 48C and communication interface 86A, 86B1, 86B2 and 86C as in the third variation. However here it is the probability value determining elements and decoding and demodulating elements that are connected to the communication interfaces, not the antenna combining elements. Therefore in this embodiment the data handling unit selecting data to be transmitted is only made up of the symbol probability value determining element 46A. For this reason the uplink data processing unit does not include the symbol probability value determining element, but only the decoding and demodulating element.

In the illustrated architecture the channel estimation, antenna weight estimation and antenna combination are done in the same way as in the third uplink variation. However, here the soft values are also calculated in each base station module and only these soft values are distributed and gathered into the base station module to which a specific mobile station has been assigned. There is also combining of radio signals from the various base station modules.

Figure 19:
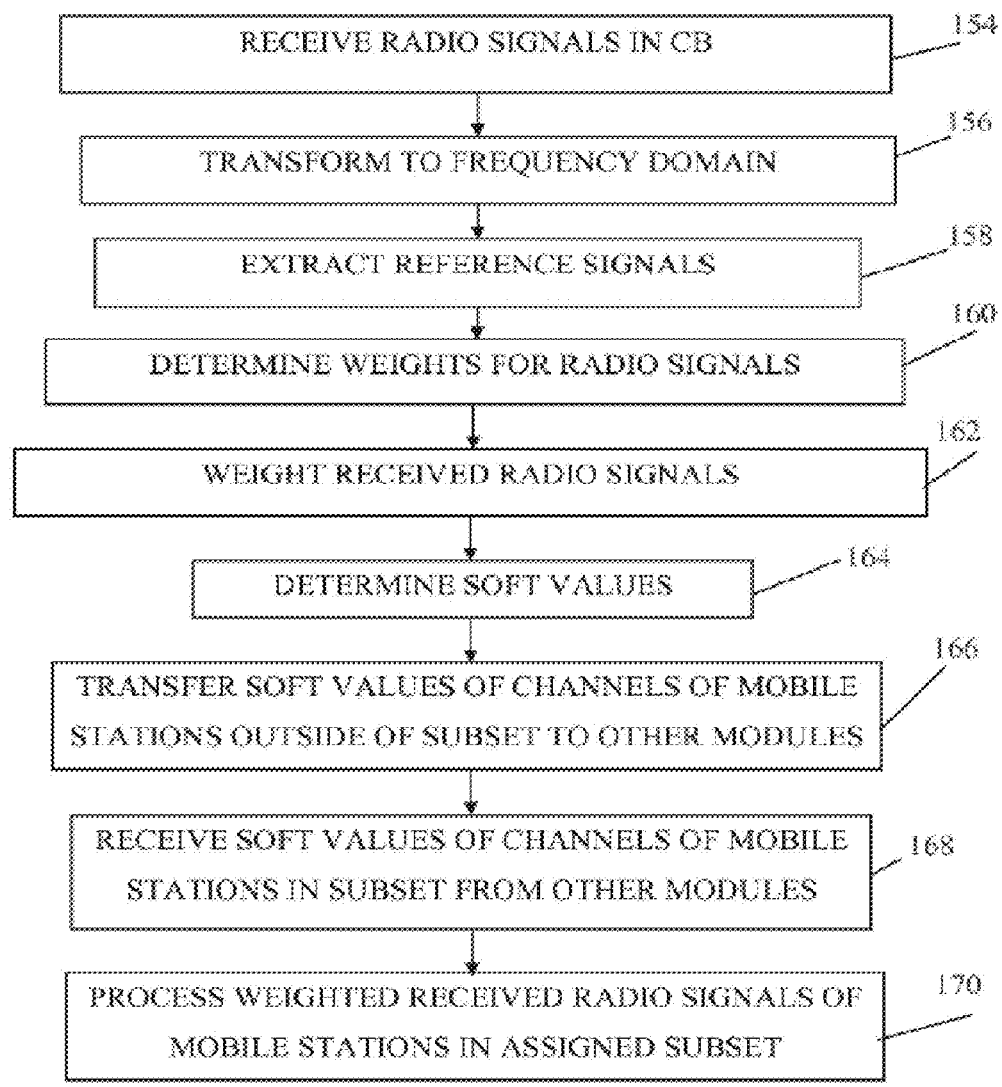
FIG. 19 shows a flow chart of a method for handling communication in a base station module according to the fourth uplink communication variation of the invention.

The method steps being performed in a base station module, for instance the first base station module 50A, of the fourth uplink variation are shown in FIG. 19 and are performed in the following way. The radio signals are received in the communication band CB via the receiving antennas 33A, step 154, and provided to the transforming unit 36A. The transforming unit 36A then transforms the received radio signals into the frequency domain, step 156. The transformed signal is then supplied to the extracting unit 108A, which extracts, from the reference signals of the communication band, the sub-carriers and symbols corresponding to reference signals that correspond to the subcarriers and carriers used by the subset of mobile stations assigned to the first base station module 50A, step 158. The extracted reference signals are then sent to the channel estimating element 112A.

The channel estimating element 112A then performs channel estimation and provides channel estimates to the local weight determining element 110A, which goes on and determines antenna weights for all the channels used by the subset of mobile stations, i.e. for the channels used by the first and second mobile station in relation to the radio signal received via the local antennas, step 160. The weights are then sent to the antenna combining element 40A which weights the radio signals received in the base station module 50A with the received weights, step 162. The antenna combining element 40A then transfers the own weighted radio signals to the probability value determining element 46A, which determines probabilities of received symbol values in the form of soft values, step 164. It thus determines probability values for the channels used by the mobile stations of the assigned subset based on the received radio signals as well as for the channels used by the mobile stations in the other subsets. It thus determines probability values for the whole set of mobile stations. The probability value determining element 46A then transfers the soft values it has determined for the other subsets to the decoding and demodulating elements 48B and 48C of the two other base station modules 50B and 50C via communication interface 86A, step 166, i.e. to the rest of the group of base station modules. The probability value determining element 46A also provides the own local decoding and demodulating element 48A with local soft values it has determined, i.e. it sends the determined probability values for channels used by the subset of mobile stations assigned to the base station module 50A to the uplink data processing unit. At the same time the decoding and demodulating element 48A also receives corresponding soft values from the probability value determining elements 46B and 46C of the two other base station modules via the communication interface 86A. The soft values it receives are here soft values relating to the subset of mobile stations assigned to the base station module 50A, step 168. The own weighted received radio signals are then processed in the decoding and demodulating element 48A using all these soft values, step 170, i.e. using the determined and received symbol probability values of the channels used by the assigned subset S1 of mobile stations.

The second and third base station modules 50B and 50C operate in the same way.

With the architecture of the fourth uplink variation, a small performance loss is expected compared to the third uplink variation. The amount of performance degradations depends mainly on which soft value calculation algorithm which is chosen. However, here the amount of data exchanged via the lateral interfaces is also decreased drastically.

For large delayed signals (a.k.a. CoMP, Coordinated Multi Point), a frequency transformation for each delay may be performed and the frequency interval for the delayed mobile station may be also be shared on the interfaces between devices.

A lateral communication interface in the uplink communication variations is here a first type of communication interface or first communication interface, while a lateral communication interface in the downlink variations is a second type of communication interface or a second communication interface.

In addition to the above frequency domain samples for traffic channels the modular concept may also be applied on preamble detection in physical channels such as Packet Random Access Channel (PRACH).

The random access preamble in uplink should be handled separately. With a straight-forward preamble detection, an FFT of size 24 576 may be applied and 837 sub-carriers for the random access channel may be extracted. With one random access channel per millisecond, this would require 837*30/1 millisecond=25 Mbps.

Figure 20:
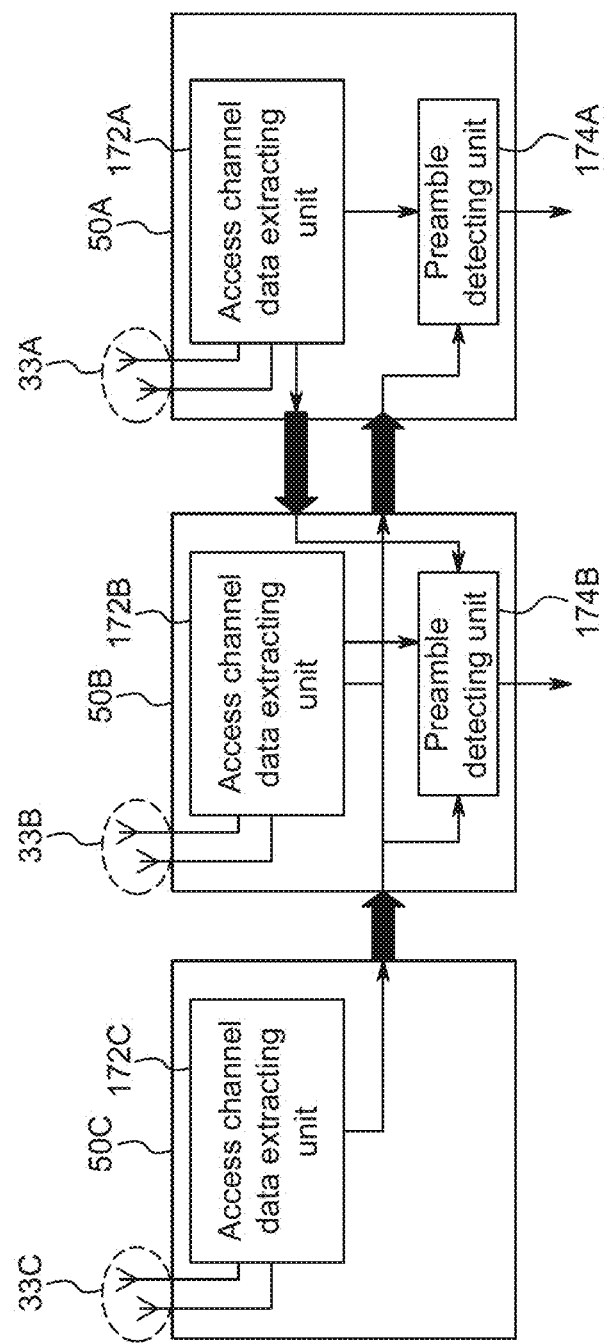
FIG. 20 shows a block schematic of the group of base station modules and units in them for detecting preambles.
Figure 21:
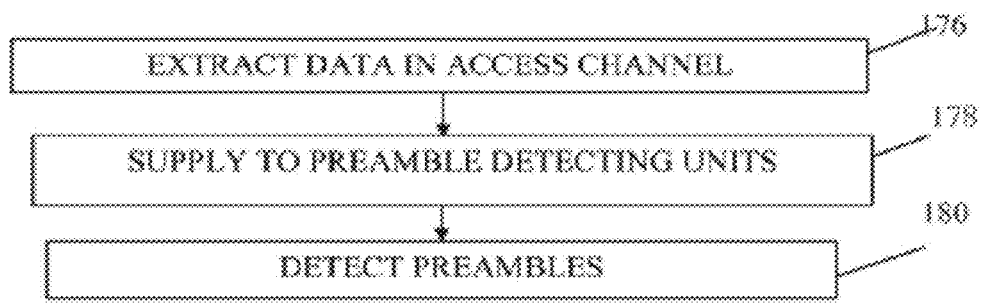
FIG. 21 shows a flow chart of a method for detecting preambles in a base station module.

An architecture for LTE random access preamble detection is illustrated in FIG. 20. Here there is an access channel data extracting unit 172A, 172B and 172C in each base station module 50A, 50B and 50C and two preamble detecting units 174A and 174B. Interfaces have here been omitted for simplifying the description of this variation of the invention. In this example a limited number of base station modules are equipped with a preamble detecting unit and here only two, the third lacks preamble detecting unit. The preamble frequency domain samples are here gathered to one base station module. In order to distribute the baseband processing between base station modules, the preamble detection may for example be split in terms of different base sequences. This means that one preamble detecting unit may be set to detect base sequences in a first base sequence interval or first group and the other base sequences in a second base sequence interval or second group. Then the signal corresponding to the same frequency interval is distributed to all base station modules which perform a preamble detection. The functioning is shown in a flow chart in FIG. 21. The access channel data extracting units 172A, 172B and 172C each extract data in at least one random access channel and at least one frequency interval, step 176. They may here be assigned different frequency intervals. The access channel data extracting units 172A, 172B and 172C then supply the extracted data to all preamble detecting units and thus to both preamble detecting units 174A and 174B, step 178. The preamble detecting units 174A and 174B then go on and detect the preambles, step 180, where the detection in one preamble detecting unit only concerns investigating of a limited number of possible preambles out of the totality of possible preambles, such as half or a third of the possible preambles.

Yet another aspect of frequency domain interfaces relates to the use of beam-forming per mobile station, both at transmitting and receiving. Beam forming is done by giving the different radio signals different weights such that the overall antenna pattern over the antennas is given a direction in which the gain is larger (typically in the direction of the desired mobile station). In other directions the gain gets smaller due to beam forming which typically should be towards interference mobile stations.

Beam forming of antennas may be performed when the number of physical available transmit antennas exceed the number of MIMO streams. The weights used in the beam-forming might be based on a DOA (Direction Of Arrival) estimator. By having this beam forming in the frequency domain, a beam forming per base station may be achieved. Also, since the beam-forming may combine several radio signals, the interfaces between the base station modules are also reduced by the beam-forming.

In the uplink a beam forming of the antennas may be performed for each mobile station, before entering baseband such that the amount of antennas that can be handled in the baseband is matched.

The calculations needed in an uplink IRC (Interference Rejection Combining) at baseband processing grows with the number of antennas processed. In order to reduce the number of radio signals to be processed in baseband, a beam forming might be done prior to the IRC, i.e. through setting a weight in an antenna combining element as shown in FIG. 14, 16 or 18.

In downlink, the number of streams to each mobile station depends on the capacity of the radio channel between the base station and the mobile station in question. It is also depending on the processing capabilities of the downlink data processing unit, bandwidth requirements of the mobile station, and number of transmitter and receiver antennas. By having the possibility to either construct several streams to each mobile station or using beam-forming a flexible and mobile station specific trade off between mobile station specific beam forming and baseband coherent antenna combining is achieved. The flexibility is measured in terms of need for MIMO branches, antenna gain (directivity of antennas), and baseband processing capacity.

Figure 22:
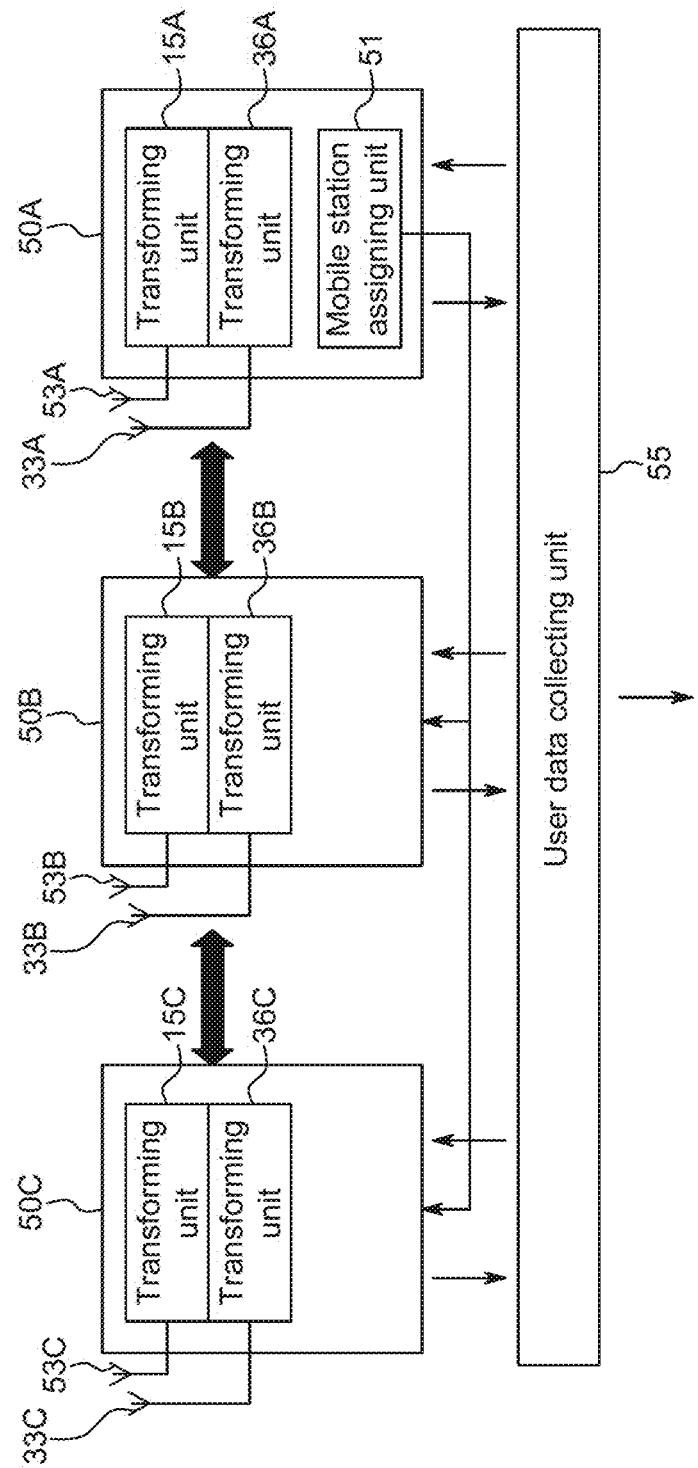
FIG. 22 shows a block schematic of the group of base station modules, where one base station module acts as a master and the others as slaves.

When connecting several base station modules to each other for forming a base station, there has to be a control of which base station module is to handle which mobile stations. One base station module may then be a "master" which controls the other base station modules as "slaves". This is schematically shown in FIG. 22, where the first base station module 50A is equipped with the mobile station assigning unit 51 acting as a master. The master device decides which layer 1 baseband processing that each other base station module should handle, i.e. the base station modules to which the mobile stations are to be assigned. For example, the master may decide which mobile stations (or frequency intervals), in downlink, that are to be calculated on each base station module. The result of these calculations might then be distributed among the base station modules to the antennas used for transmitting.

The master 51 may also decide which mobile stations (or frequency intervals) of the received radio signals, in uplink, should be processed on each base station module. Each base station module may for instance gather radio signals from all other base station modules from which it needs radio signals.

Figure 23:
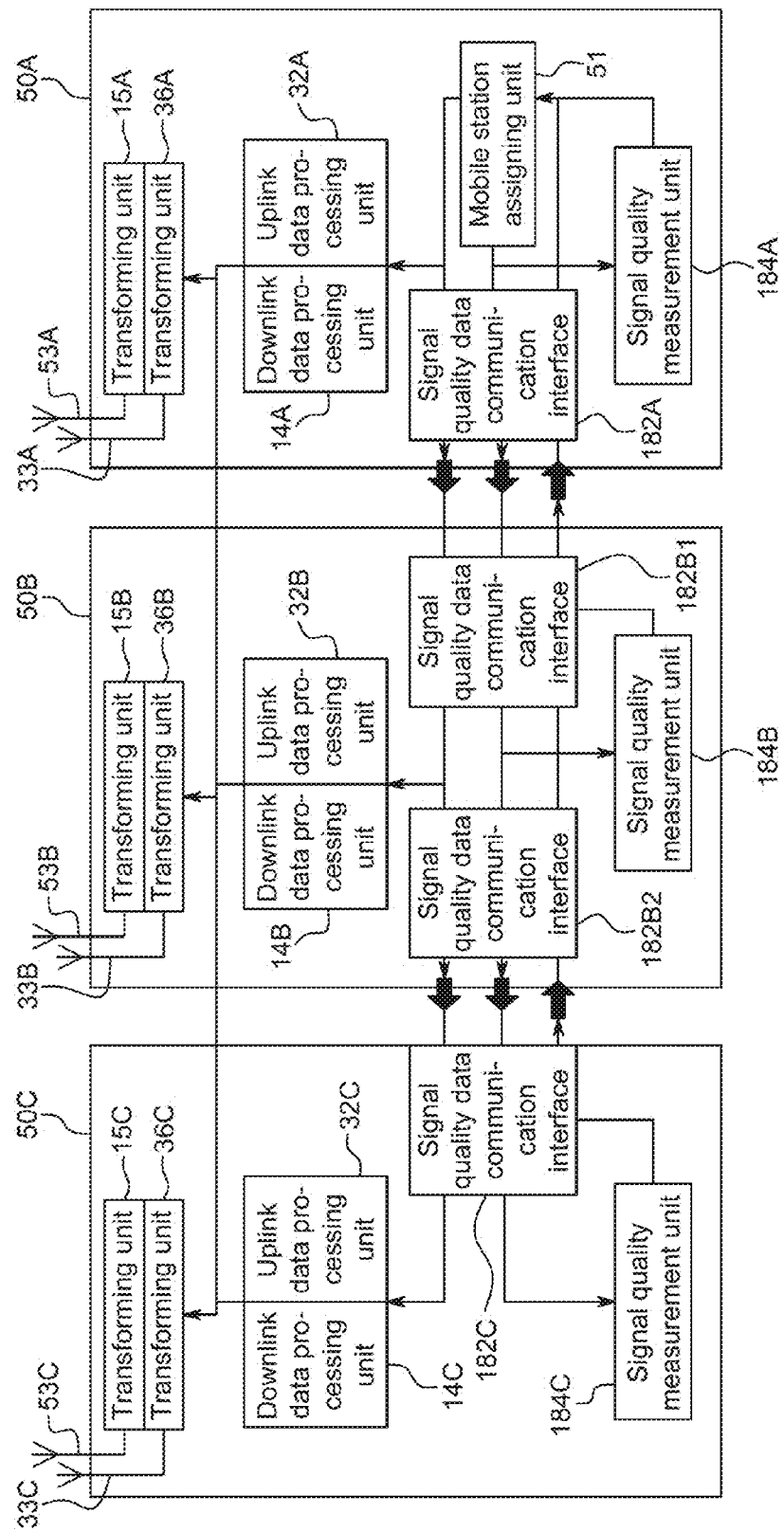
FIG. 23 shows a block schematic of the group of base station modules and units in them for allowing mobile stations to be assigned to the base station modules based on load.

The layer 2 scheduling deals with deciding on which mobile stations that are allowed to transmit on uplink or downlink. This processing is schematically indicated in the block schematic in FIG. 23. Here the all base station modules have signal quality measurement units 184A, 184B and 184C and signal quality data communication interfaces 182A, 182B1, 182B2, 182C. The master base station module 50A makes the decisions in the layer 2 scheduling functionality, while the signal quality measurement units may provide decision metrics for the scheduling, for instance measurements or calculations of the quality of the links between mobile stations and the base station. For example, interfaces 182A, 182B1, 182B2 and 182C for layer 2 scheduling may be used in the following order, as is also illustrated in FIG. 23:

1. The mobile station assigning unit 51 in the master base station module 50A distributes mobile station candidate lists and frequency interval candidates to the base station modules 50A, 50B and 50C
2. Metric calculations performed by the signal quality determining units 184A, 184B and 184C (e.g. "SINR calculation") sends metrics back to the master base station module 50A,
3. Mobile station scheduling decisions are then distributed from master base station module 50A to all base station modules.

Each base station module consumes un-coded user data to be transmitted in downlink and produces decoded user data received on the uplink. These user data are as described earlier also distributed to higher hierarchical layers. The base station module which handles these higher layers may as was earlier described provide a common interface 55 for all the base station modules towards these higher system levels. The master module may contain this user data collecting unit forming the external interface to higher layers. As an alternative it is possible that another base station module provides this interface.

With several base station modules connected together, a hardware redundancy may be exploited. By detecting and disabling defective base station modules, healthy base station modules may be reconfigured. The new configuration might be such that a lower communication capacity may be handled, but without removing all traffic of a cell.

The base station modules may be built such that if parts of a base station module are defective, the non-defective parts may still be used by other base station modules. If a module has a defective baseband processing unit, uplink or downlink, the antennas and radio circuits of that base station module may still be used by other base station modules. Also, if a module has defective antennas or radio circuits, the baseband processing units of that device may still be used.

The traffic in a cell may be highly varying over time depending on hour of the day, day in week, or special events in the vicinity of the base station module. Thus the capacity which has to be processed might vary quite significantly. In order to save power, one or several base station modules might be temporarily disabled when not needed. The other base station modules are then reconfigured to handle the traffic with fewer base station modules available. The master base station module would then take the decisions of which base station modules that should be temporarily disabled. The master base station module may act on its own notion of capacity/load or alternatively it may act on commands received from another controlling unit (e.g. base station controller, O&M controller etc). This concept may be used in a "green" or "environmental friendly" base station, i.e. a sustainable designed base station.

This temporarily disabling of a base station module may be partial, in the sense that the baseband processing is disabled while the antennas and radio circuit may still be used. Alternatively, the baseband may be used while the radio circuit and antennas are disabled.

Figure 24:
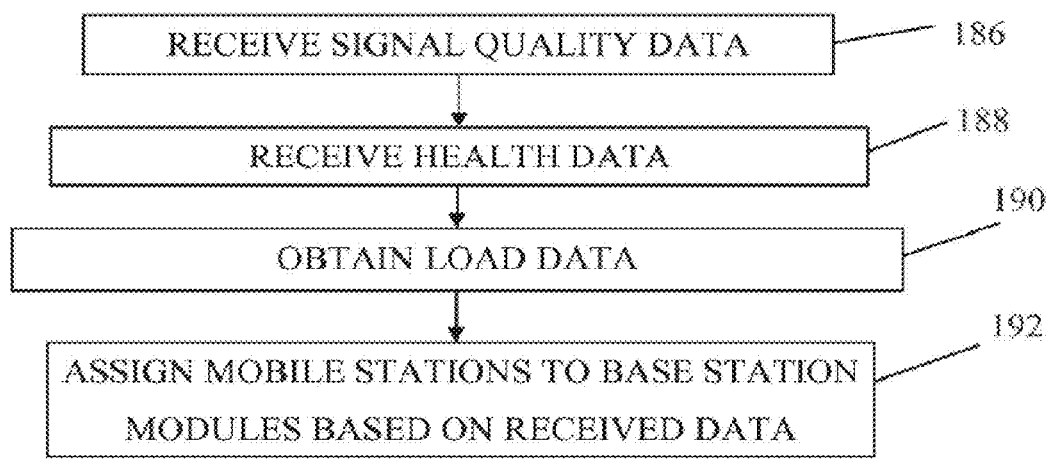
FIG. 24 shows a flow chart of a method for handling assigning of mobile stations to base station modules being performed in the base station module acting as a master.

A method combining the above mentioned ways of controlling and being performed in a mobile station assigning unit is schematically shown in FIG. 24. The mobile station assigning unit may thus receive signal quality data, step 186, from signal quality measurement units, such as signal strength measurements or SINR calculations from units 184A, 184B and 184C. It may also receive health data indicating if the whole or parts of a base station module is healthy and maybe also what parts are healthy, step 188. The health data may thus comprise fault location data. The mobile station assigning unit may also receive load data, step 190, such as data about the number of mobile stations being in contact with the base station and/or being engaged in communication via the base station. Based on all this data the mobile station assigning unit then assigns mobile stations to base station modules, step 192. The mobile station assigning unit may for instance reconfigure the use of units, elements and/or antennas based on fault location data. It may also assign mobile stations based on load, for instance temporarily disabling base station modules if the load is low.

One of the benefits of the modular base station is that a modular deployment may be used. For basic functionality, only one module is needed. The capacity may then be increased by adding more identical or similar modules. The increased capacity may be in the amount of carriers processed. Since each module contains antennas which may be utilized by other modules, the amount of layers in MIMO processing may also be increased when adding more modules. By having the possibility of increasing capacity by adding more modules, only one variant of the base station module is needed.

When integrating the baseband with the radio the interface between radio and baseband is simplified, as well as the interface between antennas and radio. Then a reduction in interface processing is achieved. This reduction is in terms of a reduction of interface hardware, processing latency, and processing power.

A frequency domain interface also simplifies distribution of radio signals to the base station modules and enables an allocation of the baseband processing of mobile stations to the different base station modules. Beam-forming per mobile station is an important future feature which is significantly simplified with frequency domain interfaces compared to time domain interfaces.

The benefits of having one base station module as master and the other as slaves are:
  Tight control of the utilization of hardware resources
  A centralized user scheduling such that the radio resources are highly utilized
  "Green" baseband
  One interface to higher layers within the master base station module By detecting and disabling defective base station modules a robust base station is achieved. Even if one base station module is defective, a reduced traffic in the cell can still be served.

In the description given above the interfaces were frequency domain interfaces. It should be realized that as an alternative they may be time domain interfaces. The required separation of signals may then be performed for instance using Iota filters.

The various units and elements of the base station module may be implemented in a number of ways. They may be provided in the form of hardware like as dedicated special purpose circuits, such as Application Specific Integrated Circuits (ASIC). However, it is also possible that they are provided in the form of software in the program memory associated with a processor provided in a base station module, which computer program comprises code for implementing the functionality of the elements and units when being run on the processor.

There are a number of variations that may be made of the invention. The modular concept of handling data need not be performed simultaneously in uplink and downlink. The uplink data handling schemes of the invention do thus not have to be combined with the downlink data handling schemes of the invention. Furthermore, if performed simultaneously, the subsets of mobile stations may differ between uplink and downlink. The mobile stations assigning schemes of the invention are furthermore also not limited to being combined with the described uplink and downlink data handling schemes, but may be used also with other such schemes. This is also true for the preamble detection. The described preamble detection may be performed independently of the described uplink handling schemes, downlink handling schemes and mobile station assigning handling schemes.

Therefore, while the invention has been described in connection with what is presently considered to be most practical and preferred embodiments, it is to be understood that the invention is not to be limited to the disclosed embodiments, but on the contrary, is intended to cover various modifications and equivalent arrangements. Therefore the invention is only to be limited by the following claims.

The invention claimed is:

1. A base station module configured to be part of a group of base station modules comprising the base station module and other base station modules, the group of base station modules together forming a base station, said base station module comprising:
   at least one antenna for receiving radio signals from mobile stations in a base station communication band comprising a number of channels;
   a first communication interface for transferring data obtained via said received radio signals to the other base station modules and for receiving corresponding data obtained via radio signals received by the other base station modules;
   a data handling unit in a processor of the base station module configured to select data for transfer to the other base station modules;
   an uplink data processing unit in a processor of the base station module configured to process channels used by a subset of mobile stations of a set of mobile stations communicating with the base station, said subset being assigned to the base station module, where said base station module is configured to use said data received from the other base station modules to influence processing in the uplink data processing unit in the processor;
   a transforming unit configured to transform the radio signals from the time domain to the frequency domain and the first communication interface is provided for communicating frequency domain signals;
   a downlink data processing unit in a processor of the base station module configured to code data to be sent in radio signals to said assigned subset of mobile stations in corresponding channels and a second communication interface configured to receive data from the other base station modules concerning the mobile stations in subsets assigned to the other base station modules and transmit data of the mobile stations in the assigned subset to the other base station modules, wherein the data received via the second communication interface are radio signals with data concerning mobile stations outside of the assigned subset;
   at least one transmitting antenna via which the data of the whole set of mobile stations is transmitted to the other modules for transmission; and
   a multiplexing unit connected to the downlink data processing unit in the processor and the second communication interface for receiving coded and modulated signals with data concerning all mobile stations and being configured to combine them to at least one radio signal for transmission over said at least one antenna.

2. The base station module according to claim 1, wherein the data handling unit in the processor comprises:
   a demultiplexing element configured to separate the received radio signals into a first radio signal group of radio signals relating to the assigned subset of mobile stations and a second radio signal group of radio signals not relating to the assigned subset of mobile stations, provide the radio signals in the second radio signal group to the first communication interface for transfer to the other base station modules and provide the radio signals of the first radio signal group to the uplink data processing unit in the processor, while the uplink data processing unit in the processor is configured to receive data relating to the assigned mobile stations from the other base station modules via the first communication interface as well as from the demultiplexing element and process the radio signals of the assigned subset of mobile stations received by all base station modules.

3. The base station module according to claim 1, further comprising:
   an extracting unit configured to extract data that comprises at least the channels used by the mobile stations of the assigned subset from said radio signals received via said at least one antenna;
   a weight determining element being configured to determine weights for the channels used by the mobile stations of the assigned subset based on said data that comprises channels; and
   an antenna combining element configured to receive said weights from said weight determining element and apply them to the radio signals received via said at least one antenna for supply of weighted radio signals to the uplink data processing unit in the processor.

4. The base station module according to claim 3, wherein the weights have been selected for contributing to said at least one antenna forming a beam together with antennas of the other base station modules.

5. The base station module according to claim 3, wherein the data handling unit in the processor comprises a symbol probability value handling element configured to determine symbol probability values for channels used by the whole set of mobile stations based on the received radio signals, send the determined probability values of the channels used by mobile stations in the assigned subset to the uplink data processing unit in the processor and the determined probability values of the channels used by mobile stations in subsets assigned to the other base station modules to the first communication interface for transfer to the other base station modules, where the uplink data processing unit in the processor is configured to receive probability values of the channels used by mobile stations in the assigned subset from said other base station modules via the first communication interface and to process the weighted radio signals using the determined and received symbol probability values.

6. The base station module according to claim 3, wherein the data handling unit in the processor comprises said antenna combining element, which is further configured to provide own weighted radio signals to the first communication interface for transfer to the other base stations modules, to receive other weighted radio signals from the other base station modules via the first communication interface, to combine the own and other weighted radio signals and supply the combined weighted signals to the uplink data processing unit in the processor for being processed.

7. The base station module according to claim 6, wherein the weight determining element is further configured to receive data comprising the channels used by the assigned mobile stations being extracted by the other base station modules, to determine weights associated with the channels for the radio signals received by the other base station modules and to transfer these weights to the other base station modules.

8. The base station module according to claim 7, wherein the extracting unit is further configured to extract from the received radio signals, data comprising the channels used by the mobile stations assigned to the other base station modules and send said data to the other base station modules, while the antenna combining element is configured to receive weights from the other base station modules via the first communication interface, which received weights are weights determined for channels used by subsets of mobile stations assigned to the other base station modules and to also apply the received weights on radio signals received via said antennas.

9. The base station module according to claim 1, where there is a preamble detecting unit in the processor in at least one of the base station modules being configured to detect at least a group of the preambles for all of the base station modules, said base station module further comprising an access channel data extracting unit configured to extract data received in an access channel and supply to every preamble detecting unit.

10. The base station module according to claim 1, wherein the downlink data processing unit in the processor is connected to the second interface for sending non-coded and non-modulated data to and receiving non-coded and non-modulated data from the other base station modules and configured to process non-coded and non-modulated data to form said at least one radio signal.

11. The base station module according to claim 1, where there is a mobile station assigning unit configured to assign mobile stations to the base station modules.

12. A method for handling communication in a base station module configured to be part of a group of base station modules comprising the base station module and other base station modules, the group of base station modules together forming a base station, the method being performed in the base station module and comprising:
  receiving radio signals from mobile stations in a base station communication band (CB) comprising a number of channels;
  transferring data obtained via said received radio signals to the other base station modules;
  receiving corresponding data obtained via radio signals received by the other base station modules;
  processing data in channels used by a subset of mobile stations communicating with the base station, the subset being assigned to the base station module;
  using said data received from the other base station modules to influence the processing, the method further comprising transforming the received radio signals from the time domain to the frequency domain, where the transferring and receiving to and from the other base station modules is performed on data in the frequency domain;
  extracting data comprising the channels used by the assigned mobile stations from the received radio signals;
  determining weights for the channels used by the mobile stations in the assigned subset based on said data that comprises channels;
  weighting the received radio signals with weights comprising said determined weights;
  determining symbol probability values for the channels used by the whole set of mobile stations based on the received radio signals;
  where the transferring of data comprises transferring symbol probability values of channels used by mobile stations in subsets assigned to the other base station modules;
  receiving data from the other base station modules comprises receiving symbol probability values of channels used by mobile stations in the assigned subset; and
  processing comprises processing the weighted radio signals using determined and received symbol probability values.

13. The method according to claim 12, further comprising:
  separating said received radio signals into a first radio signal group of radio signals relating to the assigned subset of mobile stations and a second radio signal group of radio signals not relating to the assigned subset of mobile stations,
  where the transferring comprises transferring the second radio signal group of radio signals to the other base station modules,
  the receiving of corresponding data comprises receiving radio signals from mobile stations of the assigned subset having been separated by the other base station modules and
  the processing comprises processing the radio signals in the first radio signal group and from the mobile stations of the assigned subset received by the other base station modules.

14. The method according to claim 12, wherein transferring data comprises transferring own weighted received radio signals to the other base station modules and receiving data comprises receiving other weighted radio signals received by the other base station modules, the method further comprising combining the own and other weighted radio signals and processing being performed on the combined radio signals.

15. The method according to claim 14,
  further comprising receiving data comprising the channels used by the assigned mobile stations being extracted by the other base station modules,
  where the determining of weights comprises determining of weights associated with the channels for the radio signals received by the other base station modules and
  further comprising transferring these weights to the other base station modules.

\* \* \* \* \*